United States Patent
Yang et al.

(10) Patent No.: US 12,284,609 B2
(45) Date of Patent: Apr. 22, 2025

(54) SIGNAL RECEIVING METHOD, SIGNAL SENDING METHOD, TERMINAL AND NETWORK SIDE DEVICE

(71) Applicant: DATANG MOBILE COMMUNICATIONS EQUIPMENT CO., LTD., Beijing (CN)

(72) Inventors: Meiying Yang, Beijing (CN); Lei Wang, Beijing (CN); Jiaqing Wang, Beijing (CN); Chen Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 429 days.

(21) Appl. No.: 17/413,440

(22) PCT Filed: Nov. 21, 2019

(86) PCT No.: PCT/CN2019/119900
§ 371 (c)(1),
(2) Date: Jun. 11, 2021

(87) PCT Pub. No.: WO2020/119412
PCT Pub. Date: Jun. 18, 2020

(65) Prior Publication Data
US 2022/0078709 A1    Mar. 10, 2022

(30) Foreign Application Priority Data
Dec. 14, 2018   (CN) .......................... 201811536909.3

(51) Int. Cl.
*H04W 52/02*    (2009.01)
(52) U.S. Cl.
CPC ............................ *H04W 52/0225* (2013.01)
(58) Field of Classification Search
CPC ................................................. H04W 52/0225
See application file for complete search history.

(56) References Cited

U.S. PATENT DOCUMENTS 8,423,657 B2 * 4/2013 Jun .......................... H04L 12/12
709/227
2007/0230400 A1 10/2007 Kuchibhotla et al.
(Continued)

FOREIGN PATENT DOCUMENTS

CN    102625421 A    8/2012
CN    102625432 A    8/2012
(Continued)

OTHER PUBLICATIONS

Extended European Search Report and search opinion from EP app. No. 19894891.1, dated Jan. 7, 2022, all pages.
(Continued)

*Primary Examiner* — Dai Phuong
(74) *Attorney, Agent, or Firm* — Ladas & Parry, LLP

(57) ABSTRACT

The embodiments of the present disclosure provide a signal receiving method, a signal sending method, a terminal, and a network side device. The receiving method includes: receiving, by a terminal, indication information and data scheduling information sent by a network side device; entering, by the terminal, an energy saving mode or an abnormal power consumption mode according to the indication information, wherein power consumption in the abnormal power consumption mode is lower than power consumption in the normal power consumption mode; performing, by the terminal, data transmission according to the data scheduling information when a data transmission time corresponding to the data scheduling information arrives.

17 Claims, 4 Drawing Sheets

(56) References Cited

U.S. PATENT DOCUMENTS

| | | | |
|---|---|---|---|
| 2014/0036748 A1* | 2/2014 | Mukherjee | H04W 52/0212 |
| | | | 370/311 |
| 2014/0038656 A1 | 2/2014 | Navda et al. | |
| 2015/0381830 A1 | 12/2015 | Wu et al. | |
| 2018/0092033 A1 | 3/2018 | Li et al. | |
| 2018/0132292 A1 | 5/2018 | Yang et al. | |
| 2018/0352511 A1* | 12/2018 | Martin | H04W 52/0229 |
| 2018/0376418 A1 | 12/2018 | Li et al. | |
| 2020/0053644 A1 | 2/2020 | Obermeier et al. | |
| 2020/0100184 A1 | 3/2020 | Zhang | |
| 2021/0058960 A1* | 2/2021 | Zhao | H04L 5/0048 |

FOREIGN PATENT DOCUMENTS

| | | |
|---|---|---|
| CN | 105246168 A | 1/2016 |
| CN | 106332242 A | 1/2017 |
| CN | 107027161 A | 8/2017 |
| DE | 102015110330 A1 | 12/2016 |
| WO | 2011160291 A1 | 12/2011 |
| WO | 2017100090 A1 | 6/2017 |
| WO | 2017148214 A1 | 9/2017 |
| WO | 2018218683 A1 | 12/2018 |

OTHER PUBLICATIONS

Ericsson, "Triggers of NR UE power saving", R1-1813183, 3GPP TSG-RAN WG1 Meeting #95, Spokane, USA, Nov. 12-16, 2018, all pages.
First Office Action and search report from CN app. No. 201811536909.3, dated Dec. 4, 2020, with machine English translation, all pages.
First Office Action from TW app. No. 108144074, dated Feb. 19, 2021, with machine English translation, all pages.
International Search Report from PCT/CN2019/119900, dated Feb. 25, 2020, with English translation from WIPO, all pages.
Written Opinion of the International Searching Authority from PCT/CN2019/119900, dated Feb. 25, 2020, with English translation from WIPO, all pages.
International Preliminary Report of Patentability from PCT/CN2019/119900, dated Jun. 8, 2021 with English translation from WIPO, all pages.

* cited by examiner

SIGNAL RECEIVING METHOD, SIGNAL SENDING METHOD, TERMINAL AND NETWORK SIDE DEVICE

CROSS-REFERENCE TO RELATED APPLICATIONS

This application is the U.S. national phase of PCT Application No. PCT/CN2019/119900 filed on Nov. 21, 2019, which claims a priority of the Chinese patent application No. 201811536909.3 filed on Dec. 14, 2018, the disclosures of which are incorporated herein by reference in their entireties.

TECHNICAL FIELD

The present disclosure relates to the field of communication technology, in particular to a signal receiving method, a signal sending method, a terminal and a network side device.

BACKGROUND

With the development of wireless communication systems, terminal types and service types are diversified. In terms of resource allocation, a network side device can flexibly support time-domain resource configuration, such as, a plurality of kinds of scheduling start positions S, a symbol length L, and a slot interval K0 between a Physical downlink shared channel (PDSCH) transmission time slot (slot) and a Physical downlink control channel (PDCCH) transmission time slot, a time interval K2 between a Physical uplink shared channel (PUSCH) transmission time slot and a PDCCH transmission time slot and so on. However, in the wireless communication system of the related art, after receiving the PDCCH, the terminal needs to buffer the PDSCH. Even when there is no PDSCH transmission, the PDSCH needs to be buffered, resulting in relatively high power consumption of the terminal.

SUMMARY

The present disclosure provides a signal receiving method, a signal sending method, a terminal and a network side device, so as to solve the problem of high power consumption of the terminal.

An embodiment of the present disclosure provides a signal receiving method, includes: receiving, by a terminal, indication information and data scheduling information sent by a network side device; entering, by the terminal, an energy saving mode or an abnormal power consumption mode according to the indication information, wherein power consumption in the abnormal power consumption mode is lower than power consumption in the normal power consumption mode; performing, by the terminal, data transmission according to the data scheduling information when a data transmission time corresponding to the data scheduling information arrives.

Optionally, the indication information includes at least one of the following: a processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode; the time domain interval indication is used to indicate a time domain interval between data transmission and the data scheduling information.

Optionally, if the time scheduling information indicates that the time scheduling information corresponding to the data scheduling information is the same as the previous time scheduling information, it is determined whether to enter the energy saving mode or whether to enter the abnormal power consumption mode according to the previous time scheduling information; or if the energy saving indication indicate to enter the energy saving mode, or not to enter the normal power consumption mode, the terminal enters the energy saving mode or enters the abnormal power consumption mode; or the terminal enters the energy saving mode or enter the abnormal power consumption mode according to the time scheduling information; or the terminal enters the energy saving mode or enter the abnormal power consumption mode according to the time domain interval.

Optionally, if the time scheduling information indicates that the time scheduling information corresponding to the data scheduling information is different from the previous time scheduling information, terminal does not to enter the energy saving mode, or enters the normal power consumption, or it is determined whether to enter the energy saving mode or whether to enter the abnormal power consumption mode according to the time scheduling information corresponding to the data scheduling information; or if the energy saving indication indicates not to enter the energy saving mode or to enter the normal power consumption mode, then the terminal does not enter the energy saving mode or enters the normal power consumption mode; or if the processing capability of the terminal indicates that processing time of the terminal is higher than the time domain interval, the terminal does not enter the power saving mode, or enters the normal power consumption mode.

Optionally, the processing capability threshold includes at least one of the following: a time processing capability threshold, a power consumption processing capability threshold, and an energy processing capability threshold; wherein in the case that the processing capability threshold includes the time processing capability threshold, if the processing capability of the terminal is not higher than the time processing capability threshold, the terminal enters the energy saving mode, or the abnormal power consumption mode; and/or, in the case that the processing capability threshold includes the time processing capability threshold, if the processing capability of the terminal is higher than the processing capability threshold, the terminal does not enter the energy saving mode, or enters the normal power consumption mode; or, in the case that the processing capability threshold includes the power consumption processing capability threshold or the energy processing capability threshold, if the processing capability of the terminal is not higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is higher than the power consumption processing capability threshold or the energy processing capability threshold, the terminal does not enter the energy saving mode, or enters the normal power consumption mode; or, in the case that the processing capability threshold includes the power consumption processing capability threshold or the energy processing capability threshold, if the processing capability of the terminal is higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is not higher than the power consumption processing capability threshold or the energy processing capability threshold, the terminal does not enter the energy saving mode, or enters the normal power consumption mode; or, in the case that the processing capability threshold includes the power consumption processing capability threshold and the energy processing capability threshold, if the processing capability of the terminal is not higher than the power consumption processing capability threshold or the energy processing capability threshold, or if the processing capability of the terminal is not higher than the power consumption processing capability threshold and the energy processing capability threshold, the terminal enters the energy saving mode, or the abnormal power consumption mode; and/or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the power consumption processing capability threshold and the energy processing capability threshold, the terminal does not enter the energy saving mode, or enters the normal power consumption mode; or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the processing power capability threshold and the energy processing capability threshold, the terminal enters the energy saving mode or enters the abnormal power consumption mode; and/or, in the case that the processing capability threshold includes the power consumption processing capability threshold and the energy processing capability threshold, if the processing capability of the terminal is not higher than the power consumption processing capability threshold or the energy processing capability threshold, or the processing capability of the terminal is not higher than the power consumption processing capability threshold and the energy processing capability threshold, the terminal does not enter the energy saving mode, or enters the normal power consumption mode.

Optionally, the indication information includes: indication information reported by the terminal to the network side device; or second indication information obtained by the network side device according to the first indication information reported by the terminal, wherein the first indication information and the second indication information are the same or different.

Optionally, if the network side device needs to transmit a reference signal to the terminal after sending the data scheduling information and before the data transmission, the indication information is used to indicate that the terminal does not enter the energy saving mode or enters the normal power consumption mode, and the method further includes: receiving, by the terminal, the reference signal; and/or, if the network side device does not need to transmit the reference signal to the terminal after sending the data scheduling information and before the data transmission, the indication information is used to indicate that the terminal enters the energy saving mode, or does not enter the normal power consumption mode.

Optionally, the reference signal includes at least one of the following: a channel state indication-reference signal (CSI-RS), a tracking reference signal (TRS), and a broadcast synchronization signal.

Optionally, the entering the energy saving mode or entering the abnormal power consumption mode includes: turning off part of devices of the terminal; or the entering the energy saving mode or entering the abnormal power consumption mode includes: entering a low power consumption mode or a mode where at least one energy saving technology is applied.

Optionally, the part of devices include at least one of the following: a radio frequency receiving device, a radio frequency sending device, a buffer, a baseband device, and other related device, wherein the other related device is a communication device other than the radio frequency receiving device, the radio frequency sending device, the buffer and the baseband device.

Optionally, the indication information is carried on PDCCH, PDSCH, a broadcast synchronization channel or a power saving channel, wherein the energy saving channel is used to transmit a power saving signal.

Optionally, if the indication information is carried on the PDCCH, the indication information and the data scheduling information are carried on the same DCI; or if the indication information is carried on the PDCCH, the indication information and the data scheduling information are sent on different DCIs in a same time unit; or if the indication information is carried on the PDCCH, the indication information and the data scheduling information are sent in different time units, and a time domain position of a time unit in which the PDCCH carrying the indication information is located is earlier than a time domain location of a time unit in which the PDCCH of the data scheduling information is located.

Optionally, indication information is indicated by bits; or the indication information is indicated by a scrambling code.

An embodiment of the present disclosure provides a signal sending method, includes: sending, by a network side device, indication information and data scheduling information to a terminal, wherein the indication information is used to indicate whether the terminal enters an energy saving mode or whether to enter an abnormal power consumption mode after receiving the data scheduling information, power consumption in the abnormal power consumption mode is lower than power consumption in a normal power consumption mode; performing, by the network side device, data transmission according to the data scheduling information.

Optionally, the indication information includes at least one of the following: a processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode; the time domain interval indication is used to indicate a time domain interval between data transmission and the data scheduling information.

Optionally, if the time scheduling information indicates that the time scheduling information corresponding to the data scheduling information is the same as the previous time scheduling information, the time scheduling information indication is used to indicate the terminal to determine whether to enter the energy saving mode or whether to enter the abnormal power consumption mode according to the previous time scheduling information; or if the energy saving indication indicates to enter the energy saving mode, the energy saving indication is used to indicate the terminal to enter the energy saving mode or enter the abnormal power consumption mode; or the time scheduling information is used to indicate the terminal to enter the energy saving mode or enter the abnormal power consumption mode according to the time scheduling information; or the time domain interval indication is used to indicate the terminal to enter the energy saving mode or enter the abnormal power consumption mode according to the time domain interval.

Optionally, if the time scheduling information indicates that the time scheduling information corresponding to the data scheduling information is different from the previous time scheduling information, the time scheduling information indicates the terminal not to enter the energy saving mode, or enter the normal power consumption, or the time scheduling information indicates the terminal to determine whether to enter the energy saving mode or whether to enter the abnormal power consumption mode according to the time scheduling information corresponding to the data scheduling information; or if the energy saving indication indicates not to enter the energy saving mode or to enter the normal power consumption mode, then the energy saving indication indicates the terminal not to enter the energy saving mode or enter the normal power consumption mode; or if the processing capability of the terminal indicates that processing time of the terminal is higher than the time domain interval, the time interval indication indicates the terminal not to enter the power saving mode, or enter the normal power consumption mode.

Optionally, the processing capability threshold includes at least one of the following: a time processing capability threshold, a power consumption processing capability threshold, and an energy processing capability threshold; wherein in the case that the processing capability threshold includes the time processing capability threshold, if the processing capability of the terminal is not higher than the time processing capability threshold, the terminal enters the energy saving mode, or the abnormal power consumption mode; and/or, in the case that the processing capability threshold includes the time processing capability threshold, if the processing capability of the terminal is higher than the processing capability threshold, the terminal does not enter the energy saving mode, or enters the normal power consumption mode; or, in the case that the processing capability threshold includes the power consumption processing capability threshold or the energy processing capability threshold, if the processing capability of the terminal is not higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is higher than the power consumption processing capability threshold or the energy processing capability threshold, the terminal does not enter the energy saving mode, or enters the normal power consumption mode; or, in the case that the processing capability threshold includes the power consumption processing capability threshold or the energy processing capability threshold, if the processing capability of the terminal is higher than the power consumption processing capability threshold or the energy processing capability threshold, the terminal enters the energy saving mode, or the abnormal power consumption mode; or, in the case that the processing capability threshold includes the power consumption processing capability threshold or the energy processing capability threshold, if the processing capability of the terminal is not higher than the power consumption processing capability threshold or the energy processing capability threshold, the terminal does not enter the energy saving mode, or enters the normal power consumption mode; or, in the case that the processing capability threshold includes the power consumption processing capability threshold and the energy processing capability threshold, if the processing capability of the terminal is not higher than the power consumption processing capability threshold or the energy processing capability threshold, or if the processing capability of the terminal is not higher than the power consumption processing capability threshold and the energy processing capability threshold, the terminal enters the energy saving mode, or the abnormal power consumption mode; and/or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the power consumption processing capability threshold and the energy processing capability threshold, the terminal does not enter the energy saving mode, or enters the normal power consumption mode; or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the processing power capability threshold and the energy processing capability threshold, the terminal enters the energy saving mode or enters the abnormal power consumption mode; and/or, in the case that the processing capability threshold includes the power consumption processing capability threshold and the energy processing capability threshold, if the processing capability of the terminal is not higher than the power consumption processing capability threshold or the energy processing capability threshold, or the processing capability of the terminal is not higher than the power consumption processing capability threshold and the energy processing capability threshold, the terminal does not enter the energy saving mode, or enters the normal power consumption mode.

Optionally, the indication information includes: indication information reported by the terminal to the network side device; or second indication information obtained by the network side device according to the first indication information reported by the terminal, wherein the first indication information and the second indication information are the same or different.

Optionally, if the network side device needs to transmit a reference signal to the terminal after sending the data scheduling information and before the data transmission, the indication information is used to indicate that the terminal does not enter the energy saving mode or enters the normal power consumption mode, and the method further includes: sending, by the network side device, the reference signal; and/or, if the network side device does not need to transmit the reference signal to the terminal after sending the data scheduling information and before the data transmission, the indication information is used to indicate that the terminal enters the energy saving mode, or does not enter the normal power consumption mode.

Optionally, the reference signal includes at least one of the following: a channel state indication-reference signal (CSI-RS), a tracking reference signal (TRS), and a broadcast synchronization signal.

Optionally, the entering the energy saving mode or entering the abnormal power consumption mode includes: turning off part of devices of the terminal; or the entering the energy saving mode or entering the abnormal power consumption mode includes: entering a low power consumption mode or a mode where at least one energy saving technology is applied.

Optionally, the part of devices include at least one of the following: a radio frequency receiving device, a radio frequency sending device, a buffer, a baseband device, and other related device, wherein the other related device is a communication device other than the radio frequency receiving device, the radio frequency sending device, the buffer and the baseband device.

Optionally, the indication information is carried on PDCCH, PDSCH, a broadcast synchronization channel or a power saving channel, wherein the energy saving channel is used to transmit a power saving signal.

Optionally, if the indication information is carried on the PDCCH, the indication information and the data scheduling information are carried on the same DCI; or if the indication information is carried on the PDCCH, the indication information and the data scheduling information are sent on different DCIs in a same time unit; or if the indication information is carried on the PDCCH, the indication information and the data scheduling information are sent in different time units, and a time domain position of a time unit in which the PDCCH carrying the indication information is located is earlier than a time domain location of a time unit in which the PDCCH of the data scheduling information is located.

Optionally, indication information is indicated by bits; or the indication information is indicated by a scrambling code.

An embodiment of the present disclosure provides a terminal, includes: a first receiving module, configured to receive indication information and data scheduling information sent by a network side device; an entering module, configured to enter an energy saving mode or an abnormal power consumption mode according to the indication information, wherein power consumption in the abnormal power consumption mode is lower than power consumption in the normal power consumption mode; a transmitting module, configured to perform data transmission according to the data scheduling information when a data transmission time corresponding to the data scheduling information arrives.

Optionally, the indication information includes at least one of the following: a processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode; the time domain interval indication is used to indicate a time domain interval between data transmission and the data scheduling information.

An embodiment of the present disclosure provides a network side device, includes: a first sending module, configured to send indication information and data scheduling information to a terminal, wherein the indication information is used to indicate whether the terminal enters an energy saving mode or whether to enter an abnormal power consumption mode after receiving the data scheduling information, power consumption in the abnormal power consumption mode is lower than power consumption in a normal power consumption mode; a transmitting module, configured to perform data transmission according to the data scheduling information.

Optionally, the indication information includes at least one of the following: a processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode; the time domain interval indication is used to indicate a time domain interval between data transmission and the data scheduling information.

An embodiment of the present disclosure provides a terminal, comprising: a transceiver, a memory, a processor, and a program stored on the memory and executed by the processor, wherein: the transceiver is used to receive indication information and data scheduling information sent by a network side device; the processor is configured to enter an energy saving mode or an abnormal power consumption mode according to the indication information, wherein power consumption in the abnormal power consumption mode is lower than power consumption in the normal power consumption mode; the transceiver is further configured to perform data transmission according to the data scheduling information when a data transmission time corresponding to the data scheduling information arrives; or, the transceiver is used to receive the indication information and the data scheduling information transmitted by the network side device; the transceiver is further configured to enter the energy saving mode or the abnormal power consumption mode according to the indication information, wherein the power consumption in the abnormal power consumption mode is lower than the power consumption in the normal power consumption mode; the transceiver is further configured to perform data transmission according to the data scheduling information when the data transmission time corresponding to the data scheduling information arrives.

Optionally, the indication information includes at least one of the following: a processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode; the time domain interval indication is used to indicate a time domain interval between data transmission and the data scheduling information.

An embodiment of the present disclosure provides a network side device, includes: a transceiver, a memory, a processor, and a program stored in the memory and executed by the processor, wherein: the transceiver is configured to send indication information and data scheduling information to a terminal, wherein the indication information is used to indicate whether the terminal enters an energy saving mode or whether to enter an abnormal power consumption mode after receiving the data scheduling information, power consumption in the abnormal power consumption mode is lower than power consumption in a normal power consumption mode; the transceiver is further configured to perform data transmission according to the data scheduling information.

Optionally, the indication information includes at least one of the following: a processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode; the time domain interval indication is used to indicate a time domain interval between data transmission and the data scheduling information.

An embodiment of the present disclosure provides a computer-readable storage medium on which a computer program is stored, when executed by a processor, the computer program implements the steps of the signal receiving method, or the steps of the signal sending method.

In an embodiment of the present disclosure, the terminal receives indication information and data scheduling information sent by a network side device; enters an energy saving mode or an abnormal power consumption mode according to the indication information, wherein power consumption in the abnormal power consumption mode is lower than power consumption in the normal power consumption mode; the terminal performs data transmission according to the data scheduling information when a data transmission time corresponding to the data scheduling information arrives. Since the terminal may enter the energy saving mode or the abnormal power consumption mode according to the indication information, the power consumption of the terminal is reduced.

DETAILED DESCRIPTION

In order to make the objectives, technical solutions, and advantages of the present disclosure clearer, the present disclosure will be described in detail below with reference to the accompanying drawings and specific embodiments.

Figure 1:
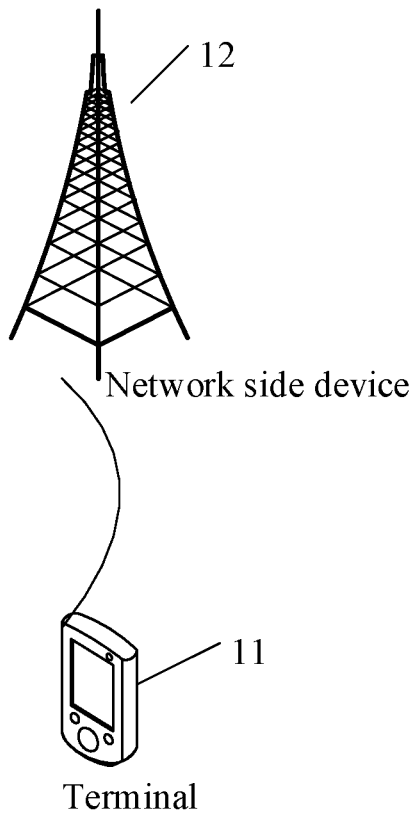
FIG. 1 is a schematic diagram of a network structure according to an embodiment of the present disclosure.

Referring to FIG. 1, which is a schematic diagram of a network structure applicable to an embodiment of the present disclosure. As shown in FIG. 1, the network structure includes a terminal 11 and a network side device 12. The terminal 11 may be a user equipment (UE) or other terminal devices, such as a mobile phone, a Tablet Personal Computer, a laptop computer, a personal digital assistants (PDA), a mobile Internet device (MID) or a wearable device. It should be noted that the specific types of terminals are not limited in the embodiments of the present disclosure. The network side device 12 may be a base station, such as a macro station, a long term evolution (LTE) base station (evolved Node B, eNB), a fifth generation mobile communication technology (5th generation, 5G) New Radio (NR) base station (Node B, NB), etc.; the network side device can also be a small station, such as low power node (LPN), pico, femto and other small stations, or the network side device can be an access point (AP); a base station can also be a network node composed of a central unit (CU) and a plurality of transmission reception points (TRPs) managed and controlled by the CU. It should be noted that the specific types of network side devices are not limited in the embodiments of the present disclosure.

Figure 2:
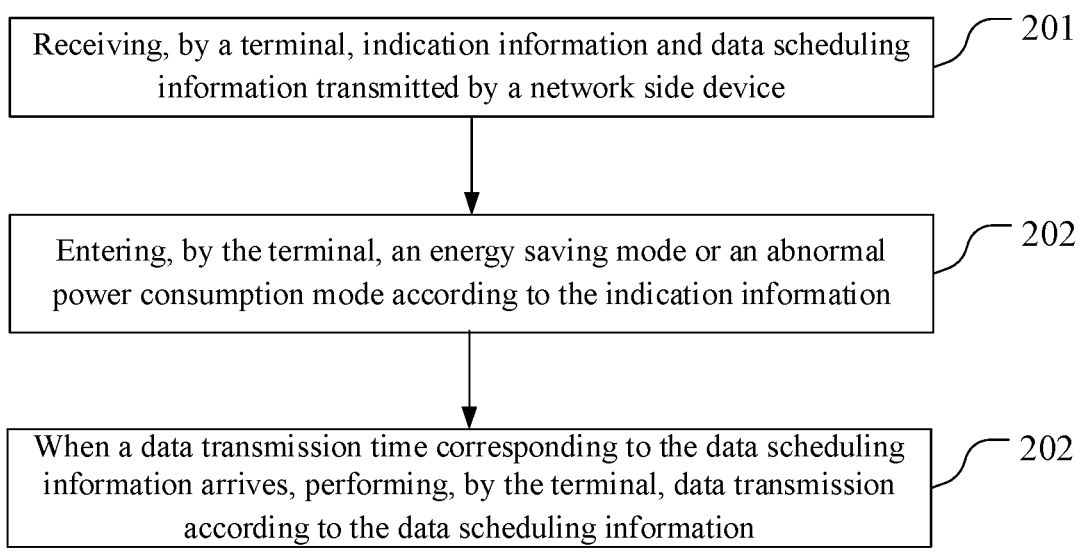
FIG. 2 is a flowchart of a signal receiving method provided by an embodiment of the present disclosure.

FIG. 2 is a flowchart of a signal receiving method provided by an embodiment of the present disclosure. As shown in FIG. 2, it includes the following steps.

201. Receiving, by a terminal, indication information and data scheduling information transmitted by a network side device;

202. Entering, by the terminal, an energy saving mode or an abnormal power consumption mode according to the indication information, wherein power consumption in the abnormal power consumption mode is lower than power consumption in the normal power consumption mode;

203. When a data transmission time corresponding to the data scheduling information arrives, performing, by the terminal, data transmission according to the data scheduling information.

In step 201, the terminal may receive the indication information and data scheduling information through different messages, or different channels, or the same channel, or the same channel. The indication information may explicitly or implicitly indicate whether the terminal enters the energy saving mode, or explicitly or implicitly indicate whether the terminal enters the abnormal power consumption mode, or explicitly or implicitly indicate whether the terminal enters a normal power consumption mode.

The data scheduling information can be used to schedule information used by the terminal for data transmission, such as PDCCH signals. The data scheduling information may indicate or include related information of data transmission of the terminal, for example, time scheduling information or frequency domain information of the terminal, and so on.

The energy saving mode may be a mode in which some devices are turned off, or a power-saving mode such as a sleep mode, and the abnormal power consumption mode may be a mode with lower power consumption than the normal power consumption mode, where the normal power consumption mode may be the power consumption mode of the terminal for data reception, or the power consumption mode for data transmission, or a mode in which all the devices required for data reception are in the on state, or the mode in which all the devices required for data transmission are in the on state.

In addition, in step 202, after receiving the data scheduling information, entering the energy saving mode or the abnormal power consumption mode according to the indication information, for example, entering the energy saving mode or the abnormal power consumption mode when the indication information meets specific conditions. For example, when the indication information implicitly or explicitly indicates to enter the energy saving mode or the abnormal power consumption mode, entering the energy saving mode or the abnormal power consumption mode. Alternatively, it may be determined to enter the energy saving mode or the abnormal power consumption mode according to the indication information, entering the energy saving mode or the abnormal power consumption mode.

Step 203 may be that the terminal recovers from the energy saving mode or the abnormal power consumption mode, for example, enters the normal power consumption mode; or the device that enters the energy saving mode or the abnormal power consumption mode and are turned off are turned on, so that when the data transmission time comes, data transmission is performed according to the data scheduling information.

The data transmission time may be the data transmission time indicated by the data scheduling information, for example, the data transmission time indicated by the time scheduling information of the data scheduling information. Of course, if the indication information indicates time scheduling information, the data transmission time may be the time indicated by the time scheduling information, or if the indication information indicates time scheduling information, and the data scheduling information also indicates time scheduling information, and the above data transmission time can be the time indicated by one of the two time scheduling information. For example, if the two time scheduling information are the same, one can be selected arbitrarily. If the two time scheduling information are not the same, the time scheduling information indicated previously shall be used.

In addition, the data transmission time may be the data transmission time or the data reception time, and the performing the data transmission according to the data scheduling information may performing the data transmission on the resources indicated by the data scheduling information (for example: a time domain resource and/or a frequency domain resource), for example, performing the data transmission according to data scheduling information, or performing the data reception according to data scheduling information.

It should be noted that the data transmission may send data of the data channel, or signals of other channels (for example: a control signal of a control channel), etc., which is not limited. For example, the performing, by the terminal, data transmission performed may include: receiving, by the terminal, a PDSCH signal or a reference signal; or sending, by the terminal, a physical uplink shared channel (PUSCH) signal.

In the embodiment of the present disclosure, the terminal can enter the energy saving mode or the abnormal power consumption mode through the above steps, so that the power consumption of the terminal can be reduced. After receiving the data scheduling information, the terminal can turn off the radio frequency and the buffer, enter the sleep state, and wake up at the time when configured data or signal is received, and receive the configured data and signal, thereby reducing the power consumption of the radio frequency receiving device and/or the radio frequency sending device after receiving the data scheduling information and before the data transmission, and reducing the power consumption of the buffer.

As an optional implementation, the indication information includes at least one of the following: processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode. The time domain interval indication is used to indicate a time domain interval between data transmission and the data scheduling information.

The processing capability threshold may include at least one value of the processing capability threshold; similarly, the value of the processing capability threshold may be an absolute value, or may be a value obtained after the absolute value is quantized, or may be a relative value, or may be an offset value relative to the terminal processing capability, or it may be the absolute value or value obtained after the absolute value is quantized, an entry index value of the offset value relative to the terminal processing capability; wherein, the index entry may be agreed by the network side device and the terminal, or may be configured by radio resource control (RRC).

The time scheduling information corresponding to the data scheduling information may be the time scheduling information indicated by the data scheduling information, or the time scheduling information associated with the data scheduling information. The previous time scheduling information may be the time scheduling information corresponding to the data scheduling information received most recently before receiving the data scheduling information.

In addition, in the embodiments of the present disclosure, the time scheduling information may also be referred to as time resources. For example, the time scheduling information may be Time Domain Resource Allocation (TDRA) information. Whether the time scheduling information corresponding to the data scheduling information is the same as the previous time scheduling information can also be referred to as whether the time resource corresponding to the data scheduling information is the same as the previous time resource (or called the most recent time resource).

Optionally, in the embodiment of the present disclosure, the time scheduling information may include at least one of K0, K2, S, L, start and length indicator value (SLIV); wherein K0 may be used for the slot interval between the PDSCH transmission slot and PDCCH transmission slot, K2 can be used to indicate the slot interval between the PUSCH transmission slot and PDCCH transmission slot, S can be used to indicate a position of a symbol in an initial transmission slot of PDSCH or PUSCH, L can identify the transmission duration of PDSCH or PUSCH.

In addition, it should be noted that the indicating whether the time scheduling information corresponding to the data scheduling information is the same as the previous time scheduling information may be, indicating whether the time scheduling information corresponding to the data scheduling information is partially or completely the same as the previous time scheduling information. For example, the time scheduling information indication may be used to indicate that at least one of K0, K2, S, L and SLIV in the two time scheduling information is the same. Wherein, the indication of the same content may be configured through RRC, or may also be agreed by the network side device and the terminal. For example, the time scheduling information indication is configured by the RRC configuration to indicate whether K0 or K2 or S or L are the same. Optionally, the time scheduling information indication may be an identifier. When the identifier is a first value, it indicates that they are the same, and when the identifier is a second value, it indicates they are different. For example, the identifier is 1 to indicate that they are the same, and 0 to indicate that they are different.

The above energy saving indication may be an identifier, for example, when the identifier is 1, it indicates to enter the energy saving mode or not enter the normal power consumption mode, and when the identifier is 2, it indicates not to enter the energy saving mode or enter the normal power consumption mode. It should be noted that if the terminal is currently in the normal power consumption mode, entering the normal power consumption mode means that the mode of the terminal does not change.

The time scheduling information may be the same as the time scheduling information corresponding to the data scheduling, and of course, it may also be different time scheduling information.

The time-domain interval indication may be a value with an Orthogonal Frequency Division Multiplexing (OFDM) symbol or a single-carrier Orthogonal Frequency Division Multiplexing (SC-OFDM) symbol as the time granularity; or it can be a value with a slot as the time granularity; it can be an absolute time, for example, a value with a second, a millisecond, and a microsecond as the time granularity.

In this implementation, it can be implemented in various ways to indicate whether the terminal enters the energy saving mode or enters the abnormal power consumption mode. It should be noted that the above indication information may be transmitted dynamically, semi-statically or statically.

In one embodiment, if the time scheduling information indicates that the time scheduling information corresponding to the data scheduling information is the same as the previous time scheduling information, then determining whether to enter the energy saving mode or whether to enter the abnormal power consumption mode according to the previous time scheduling information.

In this embodiment, the time scheduling information can be used to indicate whether the current time scheduling information is the same as the above time scheduling information, so that after receiving the above data scheduling information, the terminal can directly decide whether to enter the energy saving mode or whether to enter the abnormal power consumption mode according to the previous time scheduling information. For example, the terminal can enter the energy saving mode or enter the abnormal power consumption mode according to the K0, K2, or S of the previous time scheduling information, for example: when K0 is relatively large, or K2 is relatively large, the terminal can enter the energy saving mode, or enter the abnormal power consumption mode, otherwise, the terminal does not enter the energy saving mode; or the start position of S is at a higher symbol position, the terminal enters the energy saving mode or enters the normal power consumption mode, otherwise, the terminal does not enter the energy saving mode. In this way, the scheduling information does not need to be parsed before entering the energy saving mode, so that the power consumption of the terminal can be further reduced. When K0 is relatively large, or K2 is relatively large, specifically, it may refer to a configuration in which K0 and K2 are not less than 1.

In another embodiment, if the energy saving indication indicates to enter the energy saving mode, or not enter the normal power consumption mode, then the terminal enters the energy saving mode, or the abnormal power consumption mode.

Wherein, the above energy saving indication may be configured by the network side device according to the scheduled time scheduling information (for example: TDRA configuration) and the processing capability (or called actual processing capability) of the terminal. For example, take the TDRA configuration as an example, if the start position of S is located at a lower symbol position, after the terminal receives the data scheduling information (for example: PDCCH), there is only a little time to receive and buffer the PDSCH/PUSCH, and if the terminal turns off the radio frequency receiving device, the radio frequency sending device and the buffer and turns them on again, the power consumption caused by the conversion is greater than the power consumption at a gap after receiving the PDCCH reception and before receiving the PDSCH, the network side device can be configured by a second identifier to indicate not to enter the energy saving mode, or enter the normal power consumption mode; otherwise, the base station can be configured by a first identifier to indicate to enter the energy saving mode or not enter the normal power consumption mode.

Take the time processing capability as an example, if the data scheduling information requires a longer processing time, the start position of S is at a higher symbol position, after the terminal receives the data scheduling information, if the terminal turns off the radio frequency receiving device, the radio frequency sending device and the buffer, before the terminal turns on them, the terminal cannot complete the demodulation and decoding of the data scheduling information, and thus cannot obtain the information of the receiving time position of the PDSCH of the terminal, the base station can be configured by the second identifier to indicate not to enter the energy saving mode, or to enter the normal power consumption mode; otherwise, the base station can be configured by the first identifier to indicate to enter the energy saving mode or not to enter the normal power consumption mode; the longer processing time is required, specifically, the comparison can performed between relative values or absolute values, for example, the processing time may be greater than the average processing time, or the processing time is greater than N time units.

In this embodiment, the energy saving indication can be directly used for indication, thereby reducing the complexity.

In another implementation, it is determined to enter the energy saving mode or the abnormal power consumption mode according to the time scheduling information.

Wherein, the entering the energy saving mode or the abnormal power consumption mode according to the time scheduling information may be to determine whether to enter the energy saving mode, or whether to enter the abnormal power consumption mode based on the time scheduling information; may be to determine whether to enter the energy saving mode, or enter the abnormal power consumption mode based on the K0, K2, or S of the time scheduling information. For example, when K0 is relatively large, or K2 is relatively large, it is determined to enter the energy saving mode, or enter the abnormal power consumption mode, otherwise, it is determined not to enter the energy saving mode; or if the start position of S is at a higher symbol position, it is determined to enter the energy saving mode, or enter the normal power consumption mode, otherwise, it is determined not to enter the energy saving mode.

In this implementation, in addition to the data scheduling information, a piece of time scheduling information can be indicated, so that the time scheduling information is used to indicate to enter the energy saving mode or enter the abnormal power consumption mode. Therefore, the data scheduling information may not be demodulated and decoded before entering the energy saving mode, so as to further reduce power consumption.

In another embodiment, it is determined to enter the energy saving mode or the abnormal power consumption mode according to the time domain interval.

Wherein, entering the energy saving mode or the abnormal power consumption mode according to the time domain interval may be, if the time domain interval is greater than a preset threshold, then entering the energy saving mode, or entering the abnormal power consumption mode. Otherwise, it is determined not to enter the energy saving mode or enter the normal power consumption mode. Alternatively, it is determined to enter the energy saving mod or the abnormal power consumption mode according to the processing capability of the terminal and the time domain interval. For example, if the processing capability of the terminal indicates that the processing time of the terminal is not higher than the time domain interval, it is determined to enter the energy saving mode or the abnormal power consumption mode.

In this implementation, it can be realized that the network side device only needs to indicate the time domain interval, and the terminal can enter the energy saving mode or enter the abnormal power consumption mode, thereby reducing complexity.

As an optional implementation, if the time scheduling information indicates that the time scheduling information corresponding to the data scheduling information is different from the previous time scheduling information, it is determined not to enter the energy saving mode, or to enter the normal power consumption, or it is determined whether to enter the energy saving mode or whether to enter the abnormal power consumption mode according to the time scheduling information corresponding to the data scheduling information; or if the energy saving indication indicates not to enter the energy saving mode or to enter the normal power consumption mode, then the terminal does not enter the energy saving mode or enters the normal power consumption mode; or if the processing capability of the terminal indicates that the processing time of the terminal is higher than the time domain interval, the terminal does not enter the power saving mode, or enters the normal power consumption mode.

Wherein, the determining whether to enter the energy saving mode or whether to enter the abnormal power consumption mode according to the time scheduling information corresponding to the data scheduling information may be that under different conditions indicted by the time scheduling information, after the terminal demodulates the data scheduling information, the time scheduling information corresponding to the data scheduling information is obtained, so as to determine whether to enter the energy saving mode or whether to enter the abnormal power consumption mode according to the time scheduling information.

It should be noted that if the terminal is currently in the normal power consumption mode, the not entering the energy saving mode or entering the normal power consumption mode may be that the terminal remains in the normal power consumption mode.

In this implementation, there are various ways to make the terminal not enter the energy saving mode or enter the normal power consumption mode, thereby avoiding data transmission errors in some cases when the terminal enters the energy saving mode.

As an optional implementation, the processing capability threshold includes at least one of the following:

Time processing capability threshold, power consumption processing capability threshold, and energy processing capability threshold;

Wherein, in the case that the processing capability threshold includes the time processing capability threshold, if the processing capability of the terminal is not higher than the time processing capability threshold, the terminal enters the energy saving mode, or the abnormal power consumption mode; and/or, in the case that the processing capability threshold includes the time processing capability threshold, if the processing capability of the terminal is higher than the processing capability threshold, the terminal does not enter the energy saving mode, or enters the normal power consumption mode;

or,

In the case that the processing capability threshold includes the power consumption processing capability threshold or the energy processing capability threshold, if the processing capability of the terminal is not higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is higher than the power consumption processing capability threshold or the energy processing capability threshold, the terminal does not enter the energy saving mode, or enters the normal power consumption mode;

or,

In the case that the processing capability threshold includes the power consumption processing capability threshold or the energy processing capability threshold, if the processing capability of the terminal is higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is not higher than the power consumption processing capability threshold or the energy processing capability threshold, the terminal does not enter the energy saving mode, or enters the normal power consumption mode;

or,

In the case that the processing capability threshold includes the power consumption processing capability threshold and the energy processing capability threshold, if the processing capability of the terminal is not higher than the power consumption processing capability threshold or the energy processing capability threshold, or if the processing capability of the terminal is not higher than the power consumption processing capability threshold and the energy processing capability threshold, the terminal enters the energy saving mode, or the abnormal power consumption mode; and/or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the power consumption processing capability threshold and the energy processing capability threshold, the terminal does not enter the energy saving mode, or enters the normal power consumption mode;

or,

In the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the processing power capability threshold and the energy processing capability threshold, the terminal enters the energy saving mode or enters the abnormal power consumption mode; and/or, in the case that the processing capability threshold includes the power consumption processing capability threshold and the energy processing capability threshold, if the processing capability of the terminal is not higher than the power consumption processing capability threshold or the energy processing capability threshold, or the processing capability of the terminal is not higher than the power consumption processing capability threshold and the energy processing capability threshold, the terminal does not enter the energy saving mode, or enters the normal power consumption mode.

Similarly, the processing capabilities of the terminal may include but are not limited to at least one of the following:

Time processing capacity, power consumption processing capacity and energy processing capacity.

The processing capability of the terminal may be the capability of processing only PDCCH (PDCCH-only), or the capability of processing the sum of PDCCH and other channels/signals, for example: it may be the capability of processing PDCCH+PDSCH, it may be the processing capacity of PDCCH+PUSCH, it can be the processing capacity of PDCCH+Sounding reference signal (SRS), it can be the processing capacity of PDCCH+CSI-RS, it can be the processing capacity of PDCCH+TRS, it can be the processing capability PDCCH+synchronization signal block (SSB), and other channels or signals, which are not limited herein.

Optionally, the processing capability of the terminal may include at least one processing capability value; the terminal may report at least one processing capability value to the network side device according to the processing capability of the terminal; specifically, when the terminal supports a plurality of processing capabilities, a plurality of processing capabilities can be configured, a first processing capacity required for processing low-speed data, a second processing capacity required for processing medium-speed data, a third processing capacitor required for processing high-speed data. Wherein, low-speed data requirements may be business requirements which has no high time requirements. The terminal may use a low-speed processor and peripheral devices to process the signal/channel. The high-speed data requirements may be business requirements which has high time requirements, the terminal can use a high-speed processor and peripheral devices.

The value of the processing capability of the terminal mentioned above may be a quantized value of absolute processing, or it may be absolute processing, or it may be a relative value, or it may be an offset value relative to the processing capability of the terminal, or it may be a corresponding index entry after the absolute processing is quantized. Wherein, the index entry may be agreed upon by the network side device and the terminal, may be configured by RRC, or configured by a medium access control-control element (MAC-CE).

In addition, the processing capability of the terminal may be reported by the terminal; or, it may be transmitted to the terminal by the network side device, and the terminal replies for acknowledge. Further, the processing capability of the terminal may be statically or semi-statically configured, or dynamically configured. The above static/semi-static configuration may be configured through RRC signaling, may be configured by MAC-CE, and the above dynamic configuration may be configured by DCI.

The processing capability threshold may include at least one value of the processing capability threshold; similarly, the value of the processing capability threshold may be an absolute value, or a quantized value of the absolute value, or a relative value, or an offset value relative to the terminal processing capability, or it may be the absolute value or the quantized value of the absolute value, an index entry value of the offset value relative to the terminal processing capability; wherein, the index entry may be agreed by the network side device and the terminal and can be configured by RRC.

Optionally, the processing capability threshold transmitted by the network side device may be statically or semi-statically configured, or may be dynamically configured. Among them, the above static and semi-static configuration can be configured through RRC signaling or MAC-CE; and the above dynamic configuration can be configured through DCI; or the static, semi-static, and dynamic configuration are alternately applied for the processing capability threshold.

For example, within a time period of scheduling by the network side device, the configuration of TDRA can support the terminal to enter the energy saving mode (for example, turn off the radio frequency receiving device or radio frequency sending device, and buffer signals or buffer channels), so that the network side device can statically or semi-statically configure a first processing capability threshold, so that the actual processing capability of the terminal is always less than the first processing capability threshold in a first time range, and the terminal can enter the energy saving mode, thereby reducing the power consumption of the terminal; otherwise, the network side device can configure a second processing capability threshold, the actual processing capability of the terminal is always greater than the second processing capability threshold in the first time range, so that the terminal does not enter the energy saving mode (for example, not turn off the radio frequency receiving device and the radio frequency sending device, and the buffer signal or the buffer channel).

For another example, if the time scheduling of the network side device (for example: the configuration of TDRA) can support the configuration of the terminal to enter the energy saving mode is changed, the network side device can dynamically configure a processing capability threshold. If the terminal can enter the energy saving mode, then the network side device can configure a first processing capability threshold, so that the actual processing capability of the terminal is less than the first processing capability threshold, and the terminal enters the energy saving mode; otherwise, if the terminal cannot enter the energy saving mode, the network side device can configure a second processing capability threshold, the actual processing capability of the terminal is greater than the second processing capability threshold, so that the terminal does not enter the energy saving mode.

In addition, it should be noted that, in the case where the processing capability threshold includes at least one of the power consumption processing capability threshold and the energy processing capability threshold, there are two situations for configuration according different scenarios or terminal requirements.

In this implementation, the terminal can determine whether to enter the energy saving mode according to the processing capability of the terminal, thereby avoiding data transmission errors caused by the insufficient processing capacity of the terminal to enter the energy saving mode, so as to improve the transmission performance of the terminal. In addition, the function of the terminal can be further reduced, for example, the terminal has a relatively large power consumption processing capability or the processing energy capability, so that the terminal can be configured to enter an energy saving mode to further reduce the power consumption of the terminal.

As an optional implementation, the indication information includes: indication information reported by the terminal to the network side device; or second indication information obtained by the network side device according to the first indication information reported by the terminal, where the first indication information and the second indication information are the same or different.

Wherein, the obtaining the second indication information according to the first indication information may be that the second indication information is calculated according to the first indication information. For example, the second indication information is obtained by processing with a specific algorithm, and the algorithm may be pre-agreed by the network side device and the terminal, or defined in the agreement, etc., which is not limited. For example, an algorithm such as an alpha filtering algorithm or an averaging algorithm is used. For example, the network side device obtains the second indication information by averaging first indication information reported by the terminal and first indication information reported previously, which is not specifically limited.

In this implementation, since the indication information is reported by the terminal or calculated based on the report of the terminal, it is possible to make the terminal enter the energy saving mode more in line with the requirements of the terminal. Of course, in the embodiments of the present disclosure, this is not limited. For example, the indication information may also be directly configured by the network side device, for example configured according to the processing capability of the terminal or data scheduling information and so on.

As an optional implementation, if the network side device needs to send a reference signal to the terminal before the data transmission and after sending the data scheduling information, the indication information is used to indicate that the terminal does not enter the energy saving mode or enters the normal power consumption mode, and the method further includes: receiving the reference signal by the terminal; and/or, if the network side device does not need to send a reference signal to the terminal after sending the data scheduling information and before the data transmission, the indication information is used to indicate that the terminal enters the energy saving mode, or does not enter the normal power consumption mode.

Wherein, the reference signal may include at least one of the following: CSI-RS, TRS, a broadcast synchronization signal.

It should be noted that the indication information may be an explicit indication, for example, the indication information includes the energy saving indication, or the indication information may be an implicit indication, for example, the indication information includes the processing capability threshold, the time scheduling information indication, time scheduling information or time domain interval indication.

In this embodiment, when the reference signal needs to be transmitted, the terminal does not enter the energy saving mode, or enters the normal power consumption mode, and receives the reference signal, so as to prevent the terminal from being unable to receive the reference signal. When the reference signal needs not to be transmitted, the terminal enters the energy saving mode, or enter the normal power consumption mode, so as to reduce the power consumption of the terminal.

As an optional implementation, the entering the energy saving mode or entering the abnormal power consumption mode includes: turning off part of devices of the terminal; or the entering the energy saving mode or entering the abnormal power consumption mode includes: entering a low power consumption mode or a mode where at least one energy saving technology is applied.

Among them, the part of devices include but are not limited to at least one of the following: a radio frequency receiving device, a radio frequency sending device, a buffer, a baseband device, and other related device, where the other related device is a communication device other than the radio frequency receiving device, the radio frequency sending device, the buffer and the baseband device.

Optionally, the turning off part of the devices of the terminal may be that the terminal turns off the radio frequency receiving device and/or the radio frequency sending device, and the buffer, does not perform signal/channel transmission and reception, and enters a sleep mode.

It should be noted that in the implementation of the present disclosure, the energy saving mode or the abnormal power consumption mode may also be referred to as a sleep mode, in the sleep mode, the terminal does not send and receive data, and some devices are turned off, for example, it may be a radio frequency device, a baseband device, or other related devices. The sleep mode can include: a deep sleep mode, that is, most devices are turned off, such as: a radio frequency device, a baseband device are turned off, only a basic clock is retained. The above sleep mode can also include a light sleep mode, that is, some devices, such as radio frequency devices, or part of the radio frequency devices, and parts of baseband devices are turned off. The above sleep mode may also include a micro sleep mode, in which the terminal may not turn off any device or turn off the radio frequency receiving device, if data arrives, the radio frequency receiving device can be turned on at any time or with a very low delay (for example: ns level) to receive data/signals.

In addition, in the embodiments of the present disclosure, the modes of the terminal can also be divided into: a low power mode, a mode using at least one energy saving technology, and a normal power mode. The low power mode may be a mode in which the terminal enters at least one sleep state (wherein the sleep state here may be the sleep mode described above); and the mode using at least one energy saving technology may be a mode in which the terminal uses energy saving technology. In some embodiments, the energy saving technology is not limited. For example, it may be a technology that can save power consumption of the terminal, such as turning off the device or reducing the monitoring frequency. The normal power consumption mode may be the power consumption state of the terminal when the terminal is not configured with an energy saving mode, or the mode when the terminal is in a normal data/signal receiving state.

As an optional implementation, the indication information is carried on PDCCH, PDSCH, a broadcast synchronization channel or a power saving channel. Wherein the energy saving channel is used to send a power saving signal.

Wherein, the energy saving signal may be an existing signal, such as CSI-RS, TRS, SSB, or may be DCI, or may be a sequence, such as a wake-up signal.

In this implementation, the indication information can be transmitted in multiple ways.

Optionally, if the indication information is carried on the PDCCH, the indication information and the data scheduling information are carried on the same DCI; or if the indication information is carried on the PDCCH, the indication information and the data scheduling information are transmitted on different DCIs in the same time unit; or if the indication information is carried on the PDCCH, the indication information and the data scheduling information are transmitted in different time units, and a time domain position of a time unit in which the PDCCH carrying the indication information is located is earlier than a time domain location of a time unit in which the PDCCH of the data scheduling information is located.

The indication information and the data scheduling information may be carried on the same DCI, which means the two information may be carried in the same DCI. For example, the indication information may be indicated by a scrambling code of the DCI, or bits may be added in the DCI to indicate the indication information.

The time unit may be a slot or a sub-frame, etc., and the information transmission on different DCIs may carry these two pieces of information through two different DCI.

In this implementation, the indication information and the data scheduling information are transmitted on the same time unit or different time units through the same DCI or different DCIs, so as to save the transmission resources.

Optionally, the indication information is indicated by bits; or the indication information is indicated by a scrambling code.

In this implementation, the indication information can be carried on any channel, for example, the PDCCH, PDSCH, a broadcast synchronization channel or an energy saving channel.

The indicating the indication information by bits may be adding bits to an existing signal to indicate the indication information, or adding a new signal to indicate the indication information.

The indicating the indication information by a scrambling code can be scrambling an existing signal to indicate the indication information, thereby saving transmission resources, for example, by scrambling the indication information with a radio network temporary identifier (RNTI) and carrying the same on DCI.

For example, taking the PDCCH channel bearer as an example, the processing capability threshold can be indicated by bits. Specifically, bits can be added to the existing DCI format; a new DCI format can be added to indicate the processing capability threshold, the new DCI format may be a group-common DCI, or a UE-specific DCI; further, the processing capability threshold may be indicated by a scrambling code, specifically, a scrambling code indication is added to the existing DCI format; the DCI format can be a UE-specific DCI format or a group-common DCI format; the scrambling code can be a RNTI sequence agreed by the network side device and the terminal.

For another example, taking the energy saving channel bearer as an example, the processing capability threshold may be indicated by bits, specifically, bits may be added to the power saving signal; the processing capability threshold may be indicated by a scrambling code; the scrambling code can be a RNTI sequence agreed by the network side device and the terminal.

In the embodiment of the present disclosure, the terminal receives the indication information and data scheduling information transmitted by the network side device; after receiving the data scheduling information, the terminal enters an energy saving mode or enters an abnormal power consumption mode according to the indication information, wherein the power consumption of the abnormal power consumption mode is lower than that of the normal power consumption mode; when the data transmission time corresponding to the data scheduling information arrives, the terminal performs data transmission according to the data scheduling information. Since the terminal can enter the energy saving mode or the abnormal power consumption mode according to the indication information, the power consumption of the terminal can be reduced. In addition, in the embodiments of the present disclosure, since the terminal does not need to report time scheduling information (for example: TDRA), the network side device may perform flexible scheduling, and does not cause additional fragmentation and waste of system resources, so as to save resources.

Figure 3:
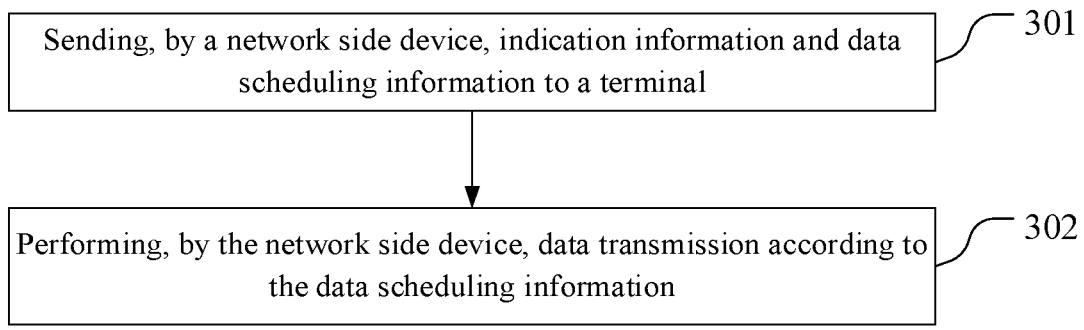
FIG. 3 is a flowchart of a signal sending method provided by an embodiment of the present disclosure.

FIG. 3 is a flowchart of a signal sending method provided by an embodiment of the present disclosure. As shown in FIG. 3, it includes the following steps.

301. Sending, by a network side device, indication information and data scheduling information to a terminal, wherein the indication information is used to indicate whether the terminal enters an energy saving mode or whether to enter an abnormal power consumption mode after receiving the data scheduling information, power consumption of the abnormal power consumption mode is lower than power consumption of the normal power consumption mode;

302. Performing, by the network side device, data transmission according to the data scheduling information.

Optionally, the indication information includes at least one of the following: processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode. The time domain interval indication is used to indicate a time domain interval between data transmission and the data scheduling information.

Optionally, if the time scheduling information indicates that the time scheduling information corresponding to the data scheduling information is the same as the previous time scheduling information, the time scheduling information indication is used to indicate the terminal to determine whether to enter the energy saving mode or whether to enter the abnormal power consumption mode following the previous time scheduling information; or if the energy saving indication indicate to enter the energy saving mode, the energy saving indication is used to indicate the terminal to enter the energy saving mode or enter the abnormal power consumption mode; or the time scheduling information is used to indicate the terminal to enter the energy saving mode or enter the abnormal power consumption mode according to the time scheduling information; or the time domain interval indication is used to indicate the terminal to enter the energy saving mode or enter the abnormal power consumption mode according to the time domain interval.

Optionally, if the time scheduling information indicates that the time scheduling information corresponding to the data scheduling information is different from the previous time scheduling information, the time scheduling information is used to indicate that the terminal does not enter the energy saving mode, or enters the normal power consumption mode, or the time scheduling information is used to indicate the terminal to decide whether to enter the energy saving mode or whether to enter the abnormal power consumption mode according to the time scheduling information corresponding to the data scheduling information; or if the energy saving indication indicates not to enter the energy saving mode or enter the normal power consumption mode, the energy saving indication is used to indicate the terminal not to enter the energy saving mode or enter the normal power consumption mode; or if the processing capability of the terminal indicates that a processing time of the terminal is higher than the time domain interval, the time domain interval indication is used to indicate the terminal not to enter the energy saving mode or enter the normal power consumption mode.

Optionally, the processing capability threshold includes at least one of the following:

Time processing capability threshold, power consumption processing capability threshold, and energy processing capability threshold;

Wherein, in the case where the processing capability threshold includes the time processing capability threshold, if the processing capability of the terminal is not higher than the time processing capability threshold, the time processing capability threshold is used to indicate to enter the energy saving mode, or enter the abnormal power consumption mode; and/or, in the case that the processing capability threshold includes the time processing capability threshold, if the processing capability of the terminal is higher than the processing capability threshold, then time processing capability threshold is used to indicate not to enter the energy saving mode, or to enter the normal power consumption mode;

or,

When the processing capability threshold includes the power consumption processing capability threshold or the energy processing capability threshold, if the processing capability of the terminal is not higher than the power consumption processing capability threshold or the energy processing capability threshold, the power consumption processing capability threshold or the energy processing capability threshold is used to indicate to enter the energy saving mode or enter the abnormal power consumption mode; and/or, in the case that the processing capability threshold includes the power consumption processing capability threshold or the energy processing capability threshold, if the processing capability of the terminal is higher than the processing power consumption threshold or the energy processing capability threshold, the processing power consumption threshold or the energy processing capability threshold is used to indicate not to enter the energy saving mode, or to enter the normal power consumption mode;

or,

In the case that the processing capability threshold includes the power consumption processing capability threshold or the energy processing capability threshold, if the processing capability of the terminal is higher than the power consumption processing capability threshold or the energy processing capability threshold, then the power consumption processing capability threshold or the energy processing capability threshold is used to indicate to enter the energy saving mode or enter the abnormal power consumption mode; and/or, the processing capability threshold includes the power consumption processing capability threshold or the energy processing capability threshold, if the processing capability of the terminal is not higher than the power consumption processing capability threshold or the energy processing capability threshold, then the power consumption processing capability threshold or the energy processing capability threshold is used to indicate not to enter the energy saving mode, or to enter the normal power consumption mode;

or,

In the case that the processing capability threshold includes the power consumption processing capability threshold and the energy processing capability threshold, if the processing capability of the terminal is not higher than the power consumption processing capability threshold or the energy processing capability threshold, or when the processing capability of the terminal is not higher than the power consumption processing capability threshold and the energy processing capability threshold, then the power consumption processing capability threshold and the energy processing capability threshold are used to indicate to enter the energy saving mode, or enter the abnormal power consumption mode; and/or, in the case that the processing capability threshold includes the power consumption processing capability threshold and the energy processing capability threshold, if the processing capability of the terminal is higher than the power consumption processing capability threshold or the energy processing capability threshold, or when the processing capability of the terminal is higher than the power consumption processing capability threshold and the energy processing capability threshold, the power consumption processing capability threshold and the energy processing capability threshold is used to indicate not to enter the energy saving mode, or to enter the normal power consumption mode;

or,

In the case that the processing capability threshold includes the power consumption processing capability threshold and the energy processing capability threshold, if the processing capability of the terminal is higher than the power consumption processing capability threshold or the energy processing capability threshold, or when the processing capability of the terminal is higher than the power consumption processing capability threshold and the energy processing capability threshold, the power consumption processing capability threshold and the energy processing capability threshold are used to indicate to enter the energy saving mode, or to enter the abnormal power consumption mode; and/or, in the case that the processing capability threshold includes the power consumption processing capability threshold and the energy processing capability threshold, if the processing capability of the terminal is not higher than the power consumption processing capability threshold or the energy processing capability threshold, or the processing capability of the terminal is not higher than the power consumption processing capability threshold and the processing energy threshold, then the power consumption processing capability threshold and the energy processing capability threshold are used to indicate not to enter the energy saving mode, or to enter the normal power consumption mode.

Optionally, the indication information includes: indication information reported by the terminal to the network side device; or second indication information obtained by the network side device according to the first indication information reported by the terminal, wherein the first indication information and the second indication information are the same or different.

Optionally, if the network side device needs to send a reference signal to the terminal before the data transmission and after sending the data scheduling information, the indication information is used to indicate that the terminal does not enter the energy saving mode or enters the normal power consumption mode, and the method further includes: receiving the reference signal by the terminal; and/or, if the network side device does not need to send a reference signal to the terminal after sending the data scheduling information and before the data transmission, the indication information is used to indicate that the terminal enters the energy saving mode, or does not enter the normal power consumption mode.

Optionally, the reference signal includes at least one of the following: CSI-RS, TRS, a broadcast synchronization signal.

Optionally, the entering the energy saving mode or entering the abnormal power consumption mode includes: turning off part of devices of the terminal; or the entering the energy saving mode or entering the abnormal power consumption mode includes: entering a low power consumption mode or a mode where at least one energy saving technology is applied.

Optionally, the part of the devices includes at least one of the following: a radio frequency receiving device, a radio frequency sending device, a buffer, a baseband device, and other related device, where the other related device is a communication device other than the radio frequency receiving device, the radio frequency sending device, the buffer and the baseband device.

Optionally, the indication information is carried on PDCCH, PDSCH, a broadcast synchronization channel or a power saving channel. Wherein the energy saving channel is used to send a power saving signal.

Optionally, if the indication information is carried on the PDCCH, the indication information and the data scheduling information are carried on the same DCI; or if the indication information is carried on the PDCCH, the indication information and the data scheduling information are transmitted on different DCIs in the same time unit; or if the indication information is carried on the PDCCH, the indication information and the data scheduling information are transmitted in different time units, and a time domain position of a time unit in which the PDCCH carrying the indication information is located is earlier than a time domain location of a time unit in which the PDCCH of the data scheduling information is located.

Optionally, the indication information is indicated by bits; or the indication information is indicated by a scrambling code.

It should be noted that this embodiment is used as an implementation of the network side device corresponding to the embodiment shown in FIG. 2. For specific implementation may refer to the related description of the embodiment shown in FIG. 2. In order to avoid repetitive description, this embodiment will not be repeated, and the same beneficial effect can be achieved.

In the following, the indication information is processing capability threshold, energy saving indication, time scheduling information indication, time scheduling information or time domain interval indication, the data scheduling information is PDCCH, the network side device is the base station, and the terminal is the UE, the embodiments of the present disclosure are illustrated by the following examples.

Example 1

In this example, the base station configures the processing capability threshold.

Step 1: The base station obtains the processing capability of the terminal.

Specifically, the processing capability of the terminal includes at least one of the following processing capabilities: time processing capability, power consumption processing capability, or energy processing capability, which will not be limited herein.

The processing capability of the terminal may be PDCCH-only processing capability, may be the total processing capability of PDCCH and other channels/signals, specifically, it may be PDCCH+PDSCH processing capability, or PDCCH+PUSCH processing capability, PDCCH+SRS processing capability, PDCCH+CSI-RS processing capability, PDCCH+TRS processing capability, PDCCH+SSB processing capability, other channels or signals processing capability, which is not limited herein.

The processing capability of the terminal includes at least one processing capability value; the terminal can report at least one processing capability value to the base station according to the processing capability thereof; specifically, when the terminal supports multiple processing capabilities, multiple processing capabilities can be configured, a first processing capacity when processing low-speed data requirements, a second processing capacity when processing medium-speed data requirements, a third processing capacity when processing high-speed data requirements. The low-speed data requirements may be a service that has no high time requirement, the UE can use a low-speed processor and peripheral devices to process signals/channels. Correspondingly, the high-speed data requirement can be a service that has a high time requirement. The UE can use a high-speed processor and peripheral devices.

The processing capability value of the terminal may be a quantized value of absolute processing, an absolute processing, a relative value, an offset value relative to the processing capability of the UE, an index entry corresponding the quantized value of absolute processing. The index entry can be agreed by the base station and the terminal, or configured by RRC.

The processing capability of the terminal may be reported by the terminal; it may be transmitted by the base station to the terminal, and the terminal replies for acknowledgement.

The processing capability of the terminal may be statically or semi-statically configured; it may be dynamically configured; the static/semi-static configuration may be configured through RRC signaling, or may be configured by MAC-CE; the dynamic configuration can be configured by DCI.

Step 2: The base station configures the processing capability threshold.

Specifically, the processing capability threshold may include at least one of the following processing capabilities, which may be a time processing capability threshold, a processing power capability threshold, a energy processing capability threshold, which is not limited herein.

The processing capability threshold specifically includes at least one value of the processing capability threshold; the value of the processing capability threshold may be an absolute value, or may be a value obtained after the absolute value is quantized, or may be a relative value, or may be an offset value relative to the UE processing capability, or it may be the absolute value or the value obtained after the absolute value is quantized, an entry index value of the offset value relative to the UE processing capability; wherein, the index entry may be agreed by the network side device and the terminal, or may be configured by RRC.

The base station may configure the processing capability threshold statically, semi-statically, or dynamically. The static or semi-static configuration may be configured through RRC signaling, or configured through MAC-CE. The dynamic configuration may be configured through DCI. The static, semi-static, and dynamic configuration may be performed alternately.

The processing capability threshold configured by the base station may be reported by the UE to the base station, and the base station may configure according to the threshold value reported by the UE, or the processing capability threshold may be an identifier configured by the base station after processing by the base station by taking the reported threshold value as input. The identifier may be directly configured by the base station according to the threshold value reported by the UE, or may be obtained by the base station after averaging the reported threshold value and previously reported threshold values.

Specifically, within a time period of scheduling by the base station, the configuration of TDRA can support the terminal to turn off the radio frequency receiving device or radio frequency sending device, and buffer signals or buffer channels, so that the base station can statically or semi-statically configure a first processing capability threshold, so that the actual processing capability of the terminal is always less than the first processing capability threshold in a first time range, and the terminal can turn off the radio frequency receiving device or radio frequency sending device, and buffer signals or buffer channels, thereby reducing the power consumption of the UE; otherwise, the base station can configure a second processing capability threshold, the actual processing capability of the terminal is always greater than the second processing capability threshold in the first time range, so that the terminal does not turn off the radio frequency receiving device and the radio frequency sending device, and the buffer signals or the buffer channels.

If the time scheduling of the base station, the configuration of TDRA, can support the terminal to turn off the radio frequency receiving device or radio frequency sending device, and buffer signals or buffer channels is changed, the base station can dynamically configure a processing capability threshold. If the terminal can turn off the radio frequency receiving device or radio frequency sending device, and buffer signals or buffer channels and enter a sleep mode, then the base station can configure a first processing capability threshold, so that the actual processing capability of the terminal is less than the first processing capability threshold, and the terminal turns off the radio frequency receiving device or radio frequency sending device, and buffer signals or buffer channels; otherwise, if the terminal cannot turn off the radio frequency receiving device or radio frequency sending device, and buffer signals or buffer channels, the base station can configure a second processing capability threshold, the actual processing capability of the terminal is greater than the second processing capability threshold, so that the terminal does not turn off the radio frequency receiving device or radio frequency sending device, and buffer signals or buffer channels, to enter the sleep mode.

Further, if the base station needs to send CSI-RS, TRS, SSB after receiving the PDCCH and before receiving the PDSCH, the base station can configure the processing capability threshold, so that the UE does not turn off the radio frequency transceiver or buffer channel/signal; specifically, the CSI-RS, TRS, and SSB (Broadcast Synchronization Channel) can be configured aperiodically or periodically; when there is no transmission requirements for CSI-RS, TRS, or SSB, the UE can configure the first processing capability threshold. When CSI-RS, TRS and SSB need to be transmitted, the base station configures the processing capability threshold of the UE as the second processing capability threshold.

When the terminal turns off the radio frequency receiving device or the radio frequency sending device, and the buffer, and does not perform signal/channel transmission and reception, the terminal can enter the sleep mode. The sleep mode may be a state in which the UE does not send and receive data, and turns off parts of devices. The parts of devices may be a radio frequency device, a baseband device, or other related devices. Specifically, it is generally believed that in the deep sleep mode, the UE turns off most of the devices, such as the radio frequency device and the baseband device, and only keeps a basic clock; in the light sleep mode, the UE turns off parts of devices, such as the radio frequency device, or part of the radio frequency devices, and part of the baseband devices. In the micro sleep mode, the UE does not turn off the device or turns off the radio frequency receiving device. If data arrives, it can be turned on at any time or with a very low delay, for example, nanosecond (ns) level, to turn on the radio frequency receiving device to receive data/signals. Or, the different modes divided by the UE includes a low power mode, a power efficient mode, and a normal power mode. In the low power mode, the UE can enter at least one sleep state. In the power efficient mode, the UE adopts at least one energy saving technology. In the normal power consumption mode, UE does not configure the power consumption state of the UE in the energy efficient mode, or the UE can normally receive data/signals.

Step 3. The base station sends the processing capability threshold.

Specifically, the processing capability threshold can be carried on the PDCCH channel and dynamically indicated by DCI; it can be carried on the PDSCH channel and indicated by RRC signaling; it can be carried on the broadcast synchronization channel and indicated by RRC signaling. Other signals/channels carrying the RRC signaling are not limited in the embodiment of the present disclosure. The processing capability threshold can be carried on a power saving channel, semi-statically or dynamically indicated through power saving signal signaling.

The power saving signal may be an existing signal, such as CSI-RS, TRS, and SSB, may be DCI, or may be a sequence, such as a wake-up signal.

For the PDCCH channel bearer, bits may indicate the processing capability threshold. Specifically, bits may be added to the existing DCI format; a new DCI format may be added to indicate the processing capability threshold. The new DCI format can be a group-common DCI or a UE-specific DCI. Further, the processing capability threshold can be indicated by a scrambling code, specifically, a scrambling code indication can be added in an existing DCI format; the DCI format may be a UE-specific DCI format or a group-common DCI format; the scrambling code may be a RNTI sequence agreed by the base station and the UE.

For the power saving channel bearer, bits may indicate the processing capability threshold. Specifically, bits may be added to the power saving signal; a scrambling code may indicate the processing capability threshold; the scrambling code may be a RNTI sequence agreed by the base station and the UE.

The RNTI may be a hexadecimal sequence of 0 to 65535.

Step 4. The base station sends the PDCCH.

Specifically, the PDCCH is used to indicate the time scheduling information of the terminal; or the base station sends the PDCCH and the processing capability threshold. If the processing capability threshold is carried on the same DCI as the data scheduling of the terminal, for example, the processing capability threshold is scrambled on the DCI by scrambling RNTI, or the processing capability threshold is carried on the same slot as the data scheduling and sending of the terminal, for example, the processing capability threshold is carried on different DCIs in the same slot, or carried on different DCIs in the same slot by scrambling RNTI, the base station can send the PDCCH and the processing capability threshold.

Step 5. The base station sends CSI-RS, TRS, SSB or PDSCH, or receives PUSCH.

Specifically, the PDSCH or PUSCH may be transmitted or received according to the PDCCH time scheduling information in step 4. The CSI-RS or TRS, SSB may be transmitted according to the PDCCH scheduling or a trigger identifier in step 4.

Example 2

In this embodiment, the base station configures whether the terminal turns off the radio frequency receiving device or the radio frequency sending device, and buffers an identifier of the signal/channel, where the above energy saving indication may be the identifier.

Step 1: The base station configures the terminal to turn off the radio frequency receiving device or the radio frequency sending device, and buffers the identifier of the signal/channel.

An identifier indicates the terminal turns off the radio frequency receiving device or the radio frequency sending device, and buffers the signal/channel, if the identifier is configured as a first identifier, the UE turns off the radio frequency receiving device or the radio frequency sending device, and buffers signal/channel. If the identifier is configured as a second identifier, the UE does not turn off the radio frequency receiving device or the radio frequency sending device, and buffer the signal/channel.

An identifier is configured by the base station to turn off the radio frequency receiving device or radio frequency sending device, and buffer the signal/channel. The identifier can be reported by the UE to the base station. The identifier may be configured by the base station through an algorithm by taking the reported identifier as an input.

According to the identifier, the base station can determine to configure the first identifier or the second identifier according to the scheduled TDRA configuration and the actual processing capability of the UE; the processing capability of the terminal includes at least one of the following processing capabilities: time processing capability, power consumption processing capacity, energy consumption processing capacity, which are not limited herein.

Specifically, taking the configuration of TDRA as an example, if the start position of S is located at a lower symbol position, after receiving the PDCCH, the UE has only a little time to receive and buffer the PDSCH/PUSCH, and if the UE turns off the radio frequency receiving device or the radio frequency sending device and buffer, the power consumption due to the conversion by turning on the related devices is greater than the power consumption within a gap after receiving the PDCCH and before receiving the PDSCH, then the base station can configure the second identifier; otherwise, the base station can configure the first identifier.

Further, taking the time processing capability as an example, if the PDCCH requires a longer processing time and the start position of S is located at a higher symbol position, after the UE receives the PDCCH, if the UE turns off the radio frequency receiving device or the radio frequency sending device, and buffer. Before turning on again, the UE cannot perform the demodulation and decoding of the PDCCH, and thus cannot obtain the information of the reception time position of the PDSCH of the UE, the base station can configure the second identifier; otherwise, it can configure the first identifier. The longer processing time can be obtained by comparing a relative value or an absolute value. For example, the processing time can be greater than an average processing time, or the processing time can be greater than N time units.

Further, if the base station needs to send CSI-RS, TRS, SSB after receiving the PDCCH and before receiving the PDSCH, the base station can configure the identifier so that the UE does not turn off the radio frequency transceiver or buffer the channel/signal; specifically, the CSI-RS, TRS, and SSB can be configured aperiodically or periodically; when there is no requirement for CSI-RS, TRS, or SSB transmission, the UE can configure the identifier as the first identifier, when CSI-RS, TRS, SSB need to be transmitted, the base station configures the identifier of the UE as the second identifier.

When the terminal turns off the radio frequency receiving device or the radio frequency sending device, and the buffer, and does not perform signal/channel transmission and reception, the terminal can enter the sleep mode. The sleep mode may be a state in which the UE does not send and receive data, and turns off parts of devices. The parts of devices may be a radio frequency device, a baseband device, or other related devices. Specifically, it is generally believed that in the deep sleep mode, the UE turns off most of the devices, such as the radio frequency device and the baseband device, and only keeps a basic clock; in the light sleep mode, the UE turns off parts of devices, such as the radio frequency device, or part of the radio frequency devices, and part of the baseband devices. In the micro sleep mode, the UE does not turn off the device or turns off the radio frequency receiving device. If data arrives, it can be turned on at any time or with a very low delay, for example, nanosecond (ns) level, to turn on the radio frequency receiving device to receive data/signals. Or, the different modes divided by the UE includes a low power mode, a power efficient mode, and a normal power mode. In the low power mode, the UE can enter at least one sleep state. In the power efficient mode, the UE adopts at least one energy saving technology. In the normal power consumption mode, UE does not configure the power consumption state of the UE in the energy efficient mode, or the UE can normally receive data/signals.

Step 2: The base station sends the identifier in step 1

The identifier in step 1 can be carried on the PDCCH channel and dynamically indicated by DCI; it can be carried on the PDSCH channel and indicated by RRC signaling or MAC-CE; it can be carried on the broadcast synchronization channel and indicated by RRC signaling. Other signals/channels carrying the RRC signaling are not limited in the embodiment of the present disclosure. The identifier can be carried on a power saving channel, semi-statically or dynamically indicated through power saving signal signaling.

The power saving signal may be an existing signal, such as CSI-RS, TRS, SSB, may be DCI, or may be a sequence, such as a wake-up signal.

For the PDCCH channel bearer, bits may indicate the processing capability threshold. Specifically, bits may be added to the existing DCI format; a new DCI format may be added to indicate the processing capability threshold. The new DCI format can be a group-common DCI or a UE-specific DCI. Further, the processing capability threshold can be indicated by a scrambling code, specifically, a scrambling code indication can be added in an existing DCI format; the DCI format may be a UE-specific DCI format or a group-common DCI format; the scrambling code may be a RNTI sequence agreed by the base station and the UE.

For the power saving channel bearer, bits may indicate the processing capability threshold. Specifically, bits may be added to the power saving signal; a scrambling code may indicate the processing capability threshold; the scrambling code may be a RNTI sequence agreed by the base station and the UE.

The RNTI may be a hexadecimal sequence of 0 to 65535.

Step 3. The base station sends the PDCCH.

Specifically, the PDCCH is used to indicate the time scheduling information of the terminal; or the base station sends the PDCCH and the identifier in step 1. If the identifier in step 1 is carried on the same DCI as the data scheduling of the terminal, for example, the processing capability threshold is scrambled on the DCI by scrambling RNTI, or the identifier in step 1 is carried on the same slot as the data scheduling and sending of the terminal, for example, the identifier in step 1 is carried on different DCIs in the same slot, or carried on different DCIs in the same slot by scrambling RNTI, the base station can send the PDCCH and the identifier.

Step 4. The base station sends CSI-RS, TRS, SSB, PDSCH, or receives PUSCH.

Specifically, the PDSCH or PUSCH is transmitted or received according to the PDCCH time scheduling information in step 4. The CSI-RS, TRS, and SSB are transmitted according to the PDCCH scheduling or a trigger identifier in step 4.

Example 3

In this embodiment, the base station configures an identifier of whether the scheduled time resource is the same as the most recent time resource, for example, the time scheduling information indication.

Step 1: The base station configures the identifier of whether the scheduled time resource is the same as the most recent time resource.

The time resource may include at least one of K0, K2, S, L, and SLIV; K0 or K2 is used to indicate a slot interval between the PDSCH or PUSCH transmission slot and the PDCCH transmission slot; S is used to indicate a position of a symbol in the slot in which the PDSCH or PUSCH is started to be transmitted; L is used to indicate a transmission duration of PDSCH or PUSCH.

The identifier of whether the time resource configured by the base station is the same as the most recent time resource may be reported by the UE to the base station. The identifier may be configured by the base station through an algorithm by taking the reported identifier as an input.

The time resources being the same means that at least one of K0, K2, S, L, and SLIV is the same. Specifically, it can be configured through RRC; it can also be agreed by the base station and the terminal.

Step 2: The base station sends the identifier in step 1

Specifically, it is the same as step 2 in the example 2, and will not be repeated here.

Step 3: The base station sends the PDCCH.

Specifically, it is the same as step 3 in the example 2 and will not be repeated here.

Step 4. The base station sends CSI-RS, TRS, SSB, PDSCH, or receives PUSCH.

Specifically, it is the same as step 4 in the example 2, and will not be repeated here.

Example 4

In this example, the base station configures TDRA, for example, the time scheduling information.

Step 1: The base station configures TDRA information.

The time resource may include at least one of K0, K2, S, L, and SLIV; K0 or K2 is used to indicate a slot interval between the PDSCH or PUSCH transmission slot and the PDCCH transmission slot; S is used to indicate a position of a symbol in the slot in which the PDSCH or PUSCH is started to be transmitted; L is used to indicate a transmission duration of PDSCH or PUSCH.

The TDRA information configured by the base station may be reported by the UE to the base station. The TDRA information may be configured by the base station through an algorithm by taking the reported TDRA information as an input.

Step 2: The base station sends the TDRA information in Step 1.

Specifically, it is the same as step 2 in the example 2, and will not be repeated here.

Step 3: The base station sends the PDCCH.

Specifically, it is the same as step 3 in the example 2, and will not be repeated here.

Wherein, if the TDRA information is carried on the DCI in the transmitted PDCCH, the TDRA information carried on PDCCH in the step 3 is the same as the TDRA information in step 2 have the same configuration; if the TDRA information indicated by the PDCCH received by the UE and the TDRA information in step 2 have different configuration, and the UE receives according to the TDRA information in step 2.

Step 4. The base station sends CSI-RS, TRS, SSB, PDSCH, or receives PUSCH.

Specifically, it is the same as step 4 in the example 2, and will not be repeated here.

Example 5

In this example, the base station configures a time-domain gap between receiving the PDCCH and receiving the PDSCH, for example: the time-domain gap indication.

Step 1: The base station configures the time-domain gap between receiving the PDCCH and receiving the PDSCH.

The time-domain gap between receiving the PDCCH and receiving the PDSCH may be a time-domain gap between starting to receive the PDCCH and starting to receive the PDSCH; and may be the time-domain gap between finishing the reception of the PDCCH and starting to receive the PDSCH.

The time-domain gap may be a value with an OFDM symbol or an SC-OFDM symbol as the time granularity; it may be a value with a slot as the time granularity; it may be a value of an absolute time, for example, with a second, a millisecond, and a microsecond as the time granularity.

The base station configures the time-domain gap between receiving the PDCCH and receiving the PDSCH, the time-domain gap may be reported by the UE to the base station. The time-domain gap may be a gap value configured by the base station through an algorithm by taking the reported gap information as an input.

Step 2: The base station sends the time-domain gap in step 1

Specifically, it is the same as step 2 in the example 2, and will not be repeated here.

Step 3: Step 3, the base station sends the PDCCH.

Specifically, it is the same as step 3 in the example 2, and will not be repeated here.

Step 4. The base station sends CSI-RS, TRS, SSB, PDSCH, or receives PUSCH.

Specifically, it is the same as step 4 in the example 2, and will not be repeated here.

Example 6

In this example, the terminal receives the processing capability threshold

Step 1: The terminal reports the processing capability.

Specifically, the processing capability of the terminal includes at least one of the following processing capabilities: time processing capability, power consumption processing capability, or energy processing capability, which will not be limited herein.

The processing capability of the terminal may be PDCCH-only processing capability, may be the total processing capability of PDCCH and other channels/signals, specifically, it may be PDCCH+PDSCH processing capability, or PDCCH+PUSCH processing capability, PDCCH+SRS processing capability, PDCCH+CSI-RS processing capability, PDCCH+TRS processing capability, PDCCH+SSB processing capability, other channels or signals processing capability, which is not limited herein.

The processing capability of the terminal includes at least one processing capability value; the terminal can report at least one processing capability value to the base station according to the processing capability thereof; specifically, when the terminal supports multiple processing capabilities, multiple processing capabilities can be configured, a first processing capacity when processing low-speed data requirements, a second processing capacity when processing medium-speed data requirements, a third processing capacity when processing high-speed data requirements. The low-speed data requirements may be a service that has no high time requirement, the UE can use a low-speed processor and peripheral devices to process signals/channels. Correspondingly, the high-speed data requirement can be a service that has a high time requirement. The UE can use a high-speed processor and peripheral devices.

The processing capability value of the terminal may be a quantized value of absolute processing, an absolute processing, a relative value, an offset value relative to the processing capability of the UE, an index entry corresponding the quantized value of absolute processing. The index entry can be agreed by the base station and the terminal, or configured by RRC.

The processing capability of the terminal may be reported by the terminal; it may be transmitted by the base station to the terminal, and the terminal replies for acknowledgement.

The processing capability of the terminal may be statically or semi-statically configured; it may be dynamically configured; the static/semi-static configuration may be configured through RRC signaling, or may be configured by MAC-CE; the dynamic configuration can be configured by DCI.

Step 2: The terminal receives the processing capability threshold.

Specifically, the processing capability threshold may include at least one of the following processing capabilities, which may be a time processing capability threshold, a processing power capability threshold, a energy processing capability threshold, which is not limited herein.

The processing capability threshold specifically includes at least one value of the processing capability threshold; the value of the processing capability threshold may be an absolute value, or may be a value obtained after the absolute value is quantized, or may be a relative value, or may be an offset value relative to the UE processing capability, or it may be the absolute value or the value obtained after the absolute value is quantized, an entry index value of the offset value relative to the UE processing capability; wherein, the index entry may be agreed by the network side device and the terminal, or may be configured by RRC.

The processing capability threshold received by the terminal may be statically, semi-statically, or dynamically received. The static or semi-static configuration may be configured through RRC signaling, or configured through MAC-CE. The dynamic configuration may be configured through DCI. The static, semi-static, and dynamic configuration may be performed alternately.

The processing capability threshold may be reported by the UE to the base station, and the base station may configure according to the threshold value reported by the UE, or the processing capability threshold may be an identifier configured by the base station after processing by the base station by taking the reported threshold value as input. The identifier may be directly configured by the base station according to the threshold value reported by the UE, or may be obtained by the base station after averaging the reported threshold value and previously reported threshold values.

Specifically, if the time scheduling of the base station received by the terminal and the configuration of TDRA can support the terminal to turn off the radio frequency receiving device or the radio frequency sending device, and the configuration of the buffer signal/channel is changed, the terminal can receive a processing capability threshold dynamically configured by the base station. If the terminal can turn off the radio frequency receiving device or radio frequency sending device, and buffer signals/channels, the terminal can receive a second processing capability threshold configured by the base station, so that the actual processing capacity of the terminal is less than the second processing capability threshold, so that the UE can turn off the radio frequency receiving device or radio frequency sending device, and buffer signals/channels; otherwise, if the terminal cannot turn off the radio frequency receiving device or radio frequency sending device, and buffer signals/channels, the base station configures the second processing capability threshold, the actual processing capacity of the terminal is greater than the second processing capability threshold, so that the UE does not turn off the radio frequency receiving device or the radio frequency sending device, and buffers the signal/channel;

Further, if the base station needs to send CSI-RS, TRS, SSB after receiving the PDCCH and before receiving the PDSCH, the base station can configure the processing capability threshold, so that the UE does not turn off the radio frequency transceiver or buffer channel/signal; specifically, the CSI-RS, TRS, and SSB (Broadcast Synchronization Channel) can be configured aperiodically or periodically; when there is no transmission requirements for CSI-RS, TRS, or SSB, the UE can configure the first processing capability threshold. When CSI-RS, TRS and SSB need to be transmitted, the base station configures the processing capability threshold of the UE as the second processing capability threshold.

When the terminal turns off the radio frequency receiving device or the radio frequency sending device, and the buffer, and does not perform signal/channel transmission and reception, the terminal can enter the sleep mode. The sleep mode may be a state in which the UE does not send and receive data, and turns off parts of devices. The parts of devices may be a radio frequency device, a baseband device, or other related devices. Specifically, it is generally believed that in the deep sleep mode, the UE turns off most of the devices, such as the radio frequency device and the baseband device, and only keeps a basic clock; in the light sleep mode, the UE turns off parts of devices, such as the radio frequency device, or part of the radio frequency devices, and part of the baseband devices. In the micro sleep mode, the UE does not turn off the device or turns off the radio frequency receiving device. If data arrives, it can be turned on at any time or with a very low delay, for example, nanosecond (ns) level, to turn on the radio frequency receiving device to receive data/signals. Or, the different modes divided by the UE includes a low power mode, a power efficient mode, and a normal power mode. In the low power mode, the UE can enter at least one sleep state. In the power efficient mode, the UE adopts at least one energy saving technology. In the normal power consumption mode, UE does not configure the power consumption state of the UE in the energy efficient mode, or the UE can normally receive data/signals.

The processing capability threshold can be carried on the PDCCH channel and dynamically indicated by DCI; it can be carried on the PDSCH channel and indicated by RRC signaling; it can be carried on the broadcast synchronization channel and indicated by RRC signaling. Other signals/channels carrying the RRC signaling are not limited in the embodiment of the present disclosure. The processing capability threshold can be carried on a power saving channel, semi-statically or dynamically indicated through power saving signal signaling. The terminal can receive the corresponding signal on the corresponding channel. The power saving signal may be an existing signal, such as CSI-RS, TRS, SSB, may be DCI, or may be a sequence, such as a wake-up signal.

For the PDCCH channel bearer, bits may indicate the processing capability threshold. Specifically, bits may be added to the existing DCI format; a new DCI format may be added to indicate the processing capability threshold. The new DCI format can be a group-common DCI or a UE-specific DCI. Further, the processing capability threshold can be indicated by a scrambling code, specifically, a scrambling code indication can be added in an existing DCI format; the DCI format may be a UE-specific DCI format or a group-common DCI format; the scrambling code may be a RNTI sequence agreed by the base station and the UE.

For the power saving channel bearer, bits may indicate the processing capability threshold. Specifically, bits may be added to the power saving signal; a scrambling code may indicate the processing capability threshold; the scrambling code may be a RNTI sequence agreed by the base station and the UE.

The RNTI may be a hexadecimal sequence of 0 to 65535.

Step 3. The terminal receives the PDCCH.

Specifically, the PDCCH is used to indicate the time scheduling information of the terminal; or the terminal receives the PDCCH transmitted by the base station and the processing capability threshold. If the processing capability threshold is carried on the same DCI as the data scheduling of the terminal, for example, the processing capability threshold is scrambled on the DCI by scrambling RNTI, or the processing capability threshold is carried on the same slot as the data scheduling and sending of the terminal, for example, the processing capability threshold is carried on different DCIs in the same slot, or carried on different DCIs in the same slot by scrambling RNTI, the base station can send the PDCCH and the processing capability threshold.

After receiving the PDCCH, the terminal can turn off the radio frequency receiving device or the radio frequency sending device, and the buffers; then demodulate and decode the PDCCH to obtain the scheduling information of the DCI.

Step 4. The terminal receives PDSCH, CSI-RS, TRS, SSB or sends PUSCH.

Specifically, the PDSCH or PUSCH is received or transmitted according to the PDCCH time scheduling information in step 3. The terminal receives the PDSCH or sends the PUSCH at the time position of receiving PDSCH or the time position of sending PUSCH indicated by the scheduling information. The CSI-RS, TRS, and SSB are transmitted according to the PDCCH scheduling or a trigger identifier in step 4.

Example 7

In this example, the terminal receives an identifier on whether to turn off the radio frequency receiving device or the radio frequency sending device, and buffer the signal/channel, such as the energy saving indication.

Step 1: The terminal receives an identifier on whether to turn off the radio frequency receiving device or the radio frequency sending device, and buffer the signal/channel.

An identifier indicates the terminal turns off the radio frequency receiving device or the radio frequency sending device, and buffers the signal/channel, if the identifier is configured as a first identifier, the UE turns off the radio frequency receiving device or the radio frequency sending device, and buffers signal/channel. If the identifier is configured as a second identifier, the UE does not turn off the radio frequency receiving device or the radio frequency sending device, and buffer the signal/channel.

According to the identifier, the base station can determine to configure the first identifier or the second identifier according to the scheduled TDRA configuration and the actual processing capability of the UE; the processing capability of the terminal includes at least one of the following processing capabilities: time processing capability, power consumption processing capacity, energy consumption processing capacity, which are not limited herein.

The identifier that the terminal turns off the radio frequency receiving device or the radio frequency sending device, and buffers signal/channel, may be reported by the UE to the base station. The base station configures according to the identifier reported by the UE that the terminal turns off the radio frequency receiving device or the radio frequency sending device, and buffers signal/channel. The identifier may be configured by the base station through an algorithm by taking the reported identifier as an input.

Specifically, taking the configuration of TDRA as an example, if the start position of S is located at a lower symbol position, after receiving the PDCCH, the UE has only a little time to receive and buffer the PDSCH/PUSCH, and if the UE turns off the radio frequency receiving device or the radio frequency sending device and buffer, the power consumption due to the conversion by turning on the related devices is greater than the power consumption within a gap after receiving the PDCCH and before receiving the PDSCH, then the base station can configure the second identifier; otherwise, the base station can configure the first identifier.

Further, taking the time processing capability as an example, if the PDCCH requires a longer processing time and the start position of S is located at a higher symbol position, after the UE receives the PDCCH, if the UE turns off the radio frequency receiving device or the radio frequency sending device, and buffer. Before turning on again, the UE cannot perform the demodulation and decoding of the PDCCH, and thus cannot obtain the information of the reception time position of the PDSCH of the UE, the base station can configure the second identifier; otherwise, it can configure the first identifier. The longer processing time can be obtained by comparing a relative value or an absolute value. For example, the processing time can be greater than an average processing time, or the processing time can be greater than N time units.

Further, taking the time processing capability as an example, if the UE can enter the sleep state according to the time processing capability, but after receiving the PDCCH and before receiving the PDSCH, the UE needs to receive other signals, such as paging, SSB, remaining minimum system information (RMSI), CSI-RS, TRS and other signals or channels, the base station can configure the second identifier to indicate the UE not to turn off the radio frequency transceiver and buffer, and not to enter the sleep state.

Further, if the base station needs to send CSI-RS, TRS, SSB after receiving the PDCCH and before receiving the PDSCH, the base station can configure the identifier so that the UE does not turn off the radio frequency transceiver or buffer the channel/signal; specifically, the CSI-RS, TRS, and SSB can be configured aperiodically or periodically; when there is no requirement for CSI-RS, TRS, or SSB transmission, the UE can configure the identifier as the first identifier, when CSI-RS, TRS, SSB need to be transmitted, the base station configures the identifier of the UE as the second identifier.

When the terminal turns off the radio frequency receiving device or the radio frequency sending device, and the buffer, and does not perform signal/channel transmission and reception, the terminal can enter the sleep mode. The sleep mode may be a state in which the UE does not send and receive data, and turns off parts of devices. The parts of devices may be a radio frequency device, a baseband device, or other related devices. Specifically, it is generally believed that in the deep sleep mode, the UE turns off most of the devices, such as the radio frequency device and the baseband device, and only keeps a basic clock; in the light sleep mode, the UE turns off parts of devices, such as the radio frequency device, or part of the radio frequency devices, and part of the baseband devices. In the micro sleep mode, the UE does not turn off the device or turns off the radio frequency receiving device. If data arrives, it can be turned on at any time or with a very low delay, for example, nanosecond (ns) level, to turn on the radio frequency receiving device to receive data/signals. Or, the different modes divided by the UE includes a low power mode, a power efficient mode, and a normal power mode. In the low power mode, the UE can enter at least one sleep state. In the power efficient mode, the UE adopts at least one energy saving technology. In the normal power consumption mode, UE does not configure the power consumption state of the UE in the energy efficient mode, or the UE can normally receive data/signals.

The identifier can be carried on the PDCCH channel and dynamically indicated by DCI; it can be carried on the PDSCH channel and indicated by RRC signaling or MAC-CE; it can be carried on the broadcast synchronization channel and indicated by RRC signaling. Other signals/channels carrying the RRC signaling are not limited in the embodiment of the present disclosure. The identifier can be carried on a power saving channel, semi-statically or dynamically indicated through power saving signal signaling. The power saving signal may be an existing signal, such as CSI-RS, TRS, SSB, may be DCI, or may be a sequence, such as a wake-up signal.

For the PDCCH channel bearer, bits may indicate the processing capability threshold. Specifically, bits may be added to the existing DCI format; a new DCI format may be added to indicate the processing capability threshold. The new DCI format can be a group-common DCI or a UE-specific DCI. Further, the processing capability threshold can be indicated by a scrambling code, specifically, a scrambling code indication can be added in an existing DCI format; the DCI format may be a UE-specific DCI format or a group-common DCI format; the scrambling code may be a RNTI sequence agreed by the base station and the UE.

For the power saving channel bearer, bits may indicate the processing capability threshold. Specifically, bits may be added to the power saving signal; a scrambling code may indicate the processing capability threshold; the scrambling code may be a RNTI sequence agreed by the base station and the UE.

The RNTI may be a hexadecimal sequence of 0 to 65535.

Step 2. The terminal receives the PDCCH.

Specifically: the PDCCH is used to indicate the time scheduling information of the terminal; or the terminal receives the PDCCH and the identifier in step 1. If the identifier in step 1 is carried on the same DCI as the data scheduling of the terminal, for example, the processing capability threshold is scrambled on the DCI by scrambling RNTI, or the identifier in step 1 is carried on the same slot as the data scheduling and sending of the terminal, for example, the identifier in step 1 is carried on different DCIs in the same slot, or carried on different DCIs in the same slot by scrambling RNTI, the terminal can receive the PDCCH and the identifier After receiving the PDCCH, the terminal can turn off the radio frequency receiving device or the radio frequency sending device, and the buffer; then the PDCCH is demodulated and decoded to obtain the scheduling information of the DCI.

Step 3. The terminal receives PDSCH, CSI-RS, TRS, SSB or sends PUSCH.

Specifically, the PDSCH or the PUSCH is received or transmitted according to the PDCCH time scheduling information in step 3. The CSI-RS, TRS, and SSB are transmitted according to the PDCCH scheduling or a trigger identifier in step 4.

Example 8

In this example, the terminal receives an identifier of whether the scheduled time resource is the same as the most recent time resource, for example: the time scheduling information indication.

Step 1: The terminal receives the identifier of whether the scheduled time resource is the same as the most recent time resource.

The time resource may include at least one of K0, K2, S, L, and SLIV; K0 or K2 is used to indicate a slot interval between the PDSCH or PUSCH transmission slot and the PDCCH transmission slot; S is used to indicate a position of a symbol in the slot in which the PDSCH or PUSCH is started to be transmitted; L is used to indicate a transmission duration of PDSCH or PUSCH.

The time resources being the same means that at least one of K0, K2, S, L, and SLIV is the same. Specifically, it can be configured through RRC; it can also be agreed by the base station and the terminal.

The terminal receives the identifier of whether the scheduled time resource is the same as the most recent time resource, the identifier may be reported by the UE to the base station. The identifier may be configured by the base station through an algorithm by taking the reported identifier as an input.

Step 2: The terminal receives the PDCCH.

Specifically, it is the same as step 2 in the example 7, and will not be repeated here.

Step 3. The terminal receives PDSCH, CSI-RS, TRS, SSB or sends PUSCH.

Specifically, it is the same as step 3 in the example 7, and will not be repeated here.

Example 9

In this embodiment, the terminal receives TDRA, for example, time scheduling information.

Step 1: The terminal receives TDRA information.

Specifically, the TDRA information may include at least one of K0, K2, S, L, and SLIV; K0 or K2 is used to indicate a slot interval between the PDSCH or PUSCH transmission slot and the PDCCH transmission slot; S is used to indicate a position of a symbol in the slot in which the PDSCH or PUSCH is started to be transmitted; L is used to indicate a transmission duration of PDSCH or PUSCH;

The TDRA information configured by the base station may be reported by the UE to the base station. The TDRA information may be configured by the base station through an algorithm by taking the reported TDRA information as an input.

Step 2: The terminal receives the PDCCH.

Specifically, it is the same as step 2 in the example 7, and will not be repeated here.

Step 3. The terminal receives PDSCH, CSI-RS, TRS, SSB or sends PUSCH.

Specifically, it is the same as step 3 in the example 7, and will not be repeated here.

Example 10

In this example, the terminal receives a time-domain gap between receiving the PDCCH and receiving the PDSCH, for example: the time-domain gap indication.

Step 1: The terminal receives the time-domain gap between receiving the PDCCH and receiving the PDSCH.

The time-domain gap between receiving the PDCCH and receiving the PDSCH may be a time-domain gap between starting to receive the PDCCH and starting to receive the PDSCH; and may be the time-domain gap between finishing the reception of the PDCCH and starting to receive the PDSCH.

The time-domain gap may be a value with an OFDM symbol or an SC-OFDM symbol as the time granularity; it may be a value with a slot as the time granularity; it may be a value of an absolute time, for example, with a second, a millisecond, and a microsecond as the time granularity.

The terminal receives the time-domain gap between receiving the PDCCH and receiving the PDSCH, the time-domain gap may be reported by the UE to the base station. The time-domain gap may be a gap value configured by the base station through an algorithm by taking the reported gap information as an input.

Step 2: The terminal receives the PDCCH.

Specifically, it is the same as step 2 in the example 7, and will not be repeated here.

Step 3. The terminal receives CSI-RS, TRS, PDSCH, SSB, or receives PUSCH.

Specifically, it is the same as step 2 in the example 7, and will not be repeated here.

Figure 4:
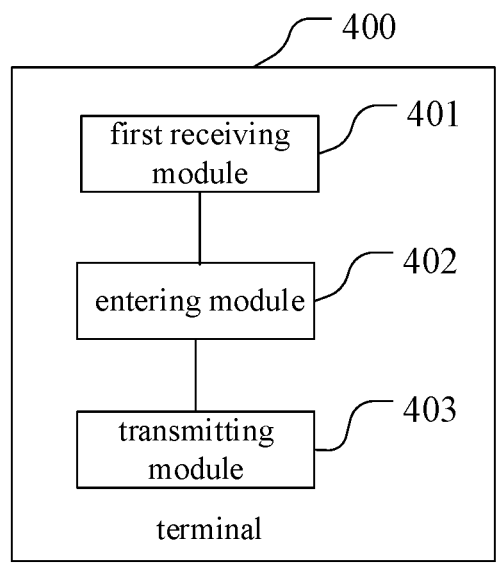
FIG. 4 is a structural diagram of a terminal provided by an embodiment of the present disclosure.

FIG. 4 is a structural diagram of a terminal provided by an embodiment of the present disclosure. As shown in FIG. 4, the terminal 400 includes: a first receiving module 401, configured to receive indication information and data scheduling information transmitted by a network side device; an entering module 402, configured to enter an energy saving mode or an abnormal power consumption mode according to the indication information, wherein power consumption in the abnormal power consumption mode is lower than power consumption in the normal power consumption mode; a transmitting module 403, configured to perform data transmission according to the data scheduling information when a data transmission time corresponding to the data scheduling information arrives.

Optionally, the indication information includes at least one of the following: processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode. The time domain interval indication is used to indicate a time domain interval between data transmission and the data scheduling information.

Optionally, if the time scheduling information indicates that the time scheduling information corresponding to the data scheduling information is the same as the previous time scheduling information, the time scheduling information indication is used to indicate the terminal to determine whether to enter the energy saving mode or whether to enter the abnormal power consumption mode following the previous time scheduling information; or if the energy saving indication indicate to enter the energy saving mode, the energy saving indication is used to indicate the terminal to enter the energy saving mode or enter the abnormal power consumption mode; or the time scheduling information is used to indicate the terminal to enter the energy saving mode or enter the abnormal power consumption mode according to the time scheduling information; or the time domain interval indication is used to indicate the terminal to enter the energy saving mode or enter the abnormal power consumption mode according to the time domain interval.

Optionally, if the time scheduling information indicates that the time scheduling information corresponding to the data scheduling information is different from the previous time scheduling information, it is determined not to enter the energy saving mode, or to enter the normal power consumption, or it is determined whether to enter the energy saving mode or whether to enter the abnormal power consumption mode according to the time scheduling information corresponding to the data scheduling information; or if the energy saving indication indicates not to enter the energy saving mode or to enter the normal power consumption mode, then the terminal does not enter the energy saving mode or enters the normal power consumption mode; or if the processing capability of the terminal indicates that the processing time of the terminal is higher than the time domain interval, the terminal does not enter the power saving mode, or enters the normal power consumption mode.

The processing capability threshold includes at least one of the following:

Time processing capability threshold, power consumption processing capability threshold, and energy processing capability threshold;

Wherein, in the case that the processing capability threshold includes the time processing capability threshold, if the processing capability of the terminal is not higher than the time processing capability threshold, the terminal enters the energy saving mode, or the abnormal power consumption mode; and/or, in the case that the processing capability threshold includes the time processing capability threshold, if the processing capability of the terminal is higher than the processing capability threshold, the terminal does not enter the energy saving mode, or enters the normal power consumption mode;

or,

In the case that the processing capability threshold includes the power consumption processing capability threshold or the energy processing capability threshold, if the processing capability of the terminal is not higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is higher than the power consumption processing capability threshold or the energy processing capability threshold, the terminal does not enter the energy saving mode, or enters the normal power consumption mode;

or,

In the case that the processing capability threshold includes the power consumption processing capability threshold or the energy processing capability threshold, if the processing capability of the terminal is higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is not higher than the power consumption processing capability threshold or the energy processing capability threshold, the terminal does not enter the energy saving mode, or enters the normal power consumption mode;

or,

In the case that the processing capability threshold includes the power consumption processing capability threshold and the energy processing capability threshold, if the processing capability of the terminal is not higher than the power consumption processing capability threshold or the energy processing capability threshold, or if the processing capability of the terminal is not higher than the power consumption processing capability threshold and the energy processing capability threshold, the terminal enters the energy saving mode, or the abnormal power consumption mode; and/or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the power consumption processing capability threshold and the energy processing capability threshold, the terminal does not enter the energy saving mode, or enters the normal power consumption mode;

or,

In the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the processing power capability threshold and the energy processing capability threshold, the terminal enters the energy saving mode or enters the abnormal power consumption mode; and/or, in the case that the processing capability threshold includes the power consumption processing capability threshold and the energy processing capability threshold, if the processing capability of the terminal is not higher than the power consumption processing capability threshold or the energy processing capability threshold, or the processing capability of the terminal is not higher than the power consumption processing capability threshold and the energy processing capability threshold, the terminal does not enter the energy saving mode, or enters the normal power consumption mode.

Optionally, the indication information includes: indication information reported by the terminal to the network side device; or second indication information obtained by the network side device according to the first indication information reported by the terminal, where the first indication information and the second indication information are the same or different.

Figure 5:
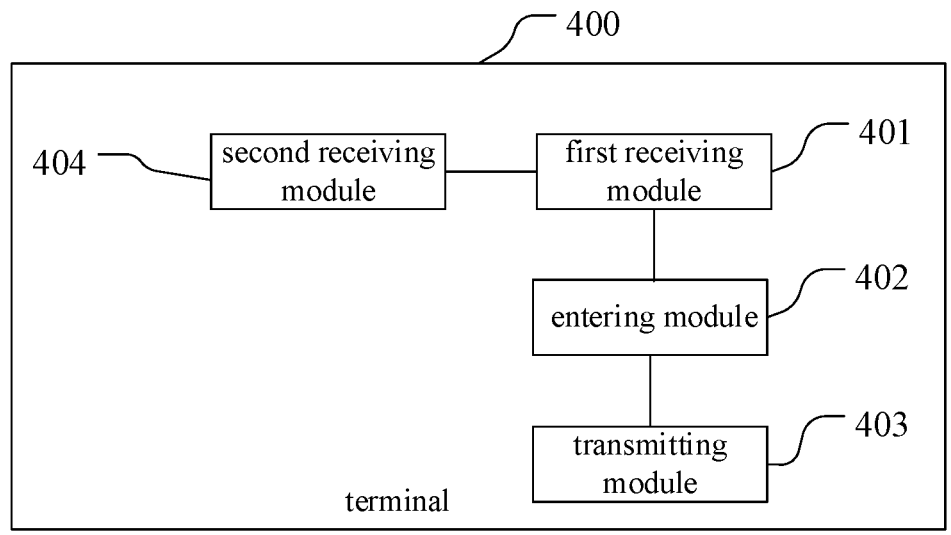
FIG. 5 is another structural diagram of a terminal provided by an embodiment of the present disclosure.

Optionally, if the network side device needs to send a reference signal to the terminal before the data transmission and after sending the data scheduling information, the indication information is used to indicate that the terminal does not enter the energy saving mode or enters the normal power consumption mode, and as shown in FIG. 5, the terminal 400 further includes: a second receiving module 404, configured to receive the reference signal; and/or if the network side device does not need to send a reference signal to the terminal after sending the data scheduling information and before the data transmission, the indication information is used to indicate that the terminal enters the energy saving mode, or does not enter the normal power consumption mode.

Optionally, the reference signal includes at least one of the following: a channel state indication-reference signal CSI-RS, a tracking reference signal TRS, and a broadcast synchronization signal.

Optionally, the entering the energy saving mode or entering the abnormal power consumption mode includes: turning off part of devices of the terminal; or the entering the energy saving mode or entering the abnormal power consumption mode includes: entering a low power consumption mode or a mode where at least one energy saving technology is applied.

Optionally, the part of devices include but are not limited to at least one of the following: a radio frequency receiving device, a radio frequency sending device, a buffer, a baseband device, and other related device, where the other related device is a communication device other than the radio frequency receiving device, the radio frequency sending device, the buffer and the baseband device.

Optionally, the indication information is carried on PDCCH, PDSCH, a broadcast synchronization channel or a power saving channel. Wherein the energy saving channel is used to send a power saving signal.

Optionally, if the indication information is carried on the PDCCH, the indication information and the data scheduling information are carried on the same DCI; or if the indication information is carried on the PDCCH, the indication information and the data scheduling information are transmitted on different DCIs in the same time unit; or if the indication information is carried on the PDCCH, the indication information and the data scheduling information are transmitted in different time units, and a time domain position of a time unit in which the PDCCH carrying the indication information is located is earlier than a time domain location of a time unit in which the PDCCH of the data scheduling information is located.

Optionally, the indication information is indicated by bits; or the indication information is indicated by a scrambling code.

It should be noted that the terminal 400 in this embodiment may be a terminal in the method embodiment of the disclosure. Any implementation of the terminal in the method embodiment of the disclosure may be used by the terminal 400 in the embodiment, and the same beneficial effects are achieved, which will not be repeated here.

Figure 6:
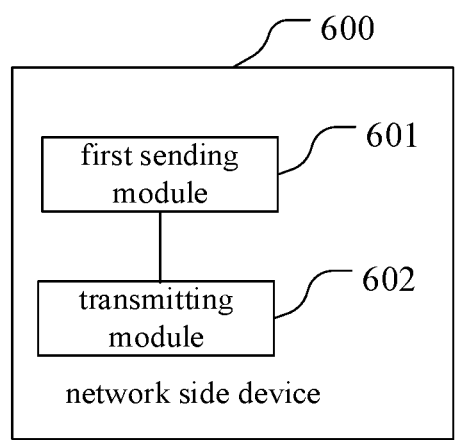
FIG. 6 is a structural diagram of a network side device provided by an embodiment of the present disclosure.

FIG. 6 is a structural diagram of a network side device provided by an embodiment of the present disclosure. As shown in FIG. 6, the network side device 600 includes: a first sending module 601, configured to send indication information and data scheduling information to a terminal, wherein the indication information is used to indicate whether the terminal enters an energy saving mode or whether to enter an abnormal power consumption mode after receiving the data scheduling information, power consumption of the abnormal power consumption mode is lower than power consumption of the normal power consumption mode; a transmitting module 602, configured to perform data transmission according to the data scheduling information.

Optionally, the indication information includes at least one of the following: processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode. The time domain interval indication is used to indicate a time domain interval between data transmission and the data scheduling information.

Optionally, if the time scheduling information indicates that the time scheduling information corresponding to the data scheduling information is the same as the previous time scheduling information, the time scheduling information indication is used to indicate the terminal to determine whether to enter the energy saving mode or whether to enter the abnormal power consumption mode following the previous time scheduling information; or if the energy saving indication indicate to enter the energy saving mode, the energy saving indication is used to indicate the terminal to enter the energy saving mode or enter the abnormal power consumption mode; or the time scheduling information is used to indicate the terminal to enter the energy saving mode or enter the abnormal power consumption mode according to the time scheduling information; or the time domain interval indication is used to indicate the terminal to enter the energy saving mode or enter the abnormal power consumption mode according to the time domain interval.

Optionally, if the time scheduling information indicates that the time scheduling information corresponding to the data scheduling information is different from the previous time scheduling information, the time scheduling information is used to indicate that the terminal does not enter the energy saving mode, or enters the normal power consumption mode, or the time scheduling information is used to indicate the terminal to decide whether to enter the energy saving mode or whether to enter the abnormal power consumption mode according to the time scheduling information corresponding to the data scheduling information; or if the energy saving indication indicates not to enter the energy saving mode or enter the normal power consumption mode, the energy saving indication is used to indicate the terminal not to enter the energy saving mode or enter the normal power consumption mode; or if the processing capability of the terminal indicates that a processing time of the terminal is higher than the time domain interval, the time domain interval indication is used to indicate the terminal not to enter the energy saving mode or enter the normal power consumption mode.

Optionally, the processing capability threshold includes at least one of the following:

Time processing capability threshold, power consumption processing capability threshold, and energy processing capability threshold;

Wherein, in the case where the processing capability threshold includes the time processing capability threshold, if the processing capability of the terminal is not higher than the time processing capability threshold, the time processing capability threshold is used to indicate to enter the energy saving mode, or enter the abnormal power consumption mode; and/or, in the case that the processing capability threshold includes the time processing capability threshold, if the processing capability of the terminal is higher than the processing capability threshold, then time processing capability threshold is used to indicate not to enter the energy saving mode, or to enter the normal power consumption mode;

or,

When the processing capability threshold includes the power consumption processing capability threshold or the energy processing capability threshold, if the processing capability of the terminal is not higher than the power consumption processing capability threshold or the energy processing capability threshold, the power consumption processing capability threshold or the energy processing capability threshold is used to indicate to enter the energy saving mode or enter the abnormal power consumption mode; and/or, in the case that the processing capability threshold includes the power consumption processing capability threshold or the energy processing capability threshold, if the processing capability of the terminal is higher than the processing power consumption threshold or the energy processing capability threshold, the processing power consumption threshold or the energy processing capability threshold is used to indicate not to enter the energy saving mode, or to enter the normal power consumption mode;

or,

In the case that the processing capability threshold includes the power consumption processing capability threshold or the energy processing capability threshold, if the processing capability of the terminal is higher than the power consumption processing capability threshold or the energy processing capability threshold, then the power consumption processing capability threshold or the energy processing capability threshold is used to indicate to enter the energy saving mode or enter the abnormal power consumption mode; and/or, the processing capability threshold includes the power consumption processing capability threshold or the energy processing capability threshold, if the processing capability of the terminal is not higher than the power consumption processing capability threshold or the energy processing capability threshold, then the power consumption processing capability threshold or the energy processing capability threshold is used to indicate not to enter the energy saving mode, or to enter the normal power consumption mode;

or,

In the case that the processing capability threshold includes the power consumption processing capability threshold and the energy processing capability threshold, if the processing capability of the terminal is not higher than the power consumption processing capability threshold or the energy processing capability threshold, or when the processing capability of the terminal is not higher than the power consumption processing capability threshold and the energy processing capability threshold, then the power consumption processing capability threshold and the energy processing capability threshold are used to indicate to enter the energy saving mode, or enter the abnormal power consumption mode; and/or, in the case that the processing capability threshold includes the power consumption processing capability threshold and the energy processing capability threshold, if the processing capability of the terminal is higher than the power consumption processing capability threshold or the energy processing capability threshold, or when the processing capability of the terminal is higher than the power consumption processing capability threshold and the energy processing capability threshold, the power consumption processing capability threshold and the energy processing capability threshold is used to indicate not to enter the energy saving mode, or to enter the normal power consumption mode;

or,

In the case that the processing capability threshold includes the power consumption processing capability threshold and the energy processing capability threshold, if the processing capability of the terminal is higher than the power consumption processing capability threshold or the energy processing capability threshold, or when the processing capability of the terminal is higher than the power consumption processing capability threshold and the energy processing capability threshold, the power consumption processing capability threshold and the energy processing capability threshold are used to indicate to enter the energy saving mode, or to enter the abnormal power consumption mode; and/or, in the case that the processing capability threshold includes the power consumption processing capability threshold and the energy processing capability threshold, if the processing capability of the terminal is not higher than the power consumption processing capability threshold or the energy processing capability threshold, or the processing capability of the terminal is not higher than the power consumption processing capability threshold and the processing energy threshold, then the power consumption processing capability threshold and the energy processing capability threshold are used to indicate not to enter the energy saving mode, or to enter the normal power consumption mode.

Optionally, the indication information includes: indication information reported by the terminal to the network side device; or second indication information obtained by the network side device according to the first indication information reported by the terminal, wherein the first indication information and the second indication information are the same or different.

Figure 7:
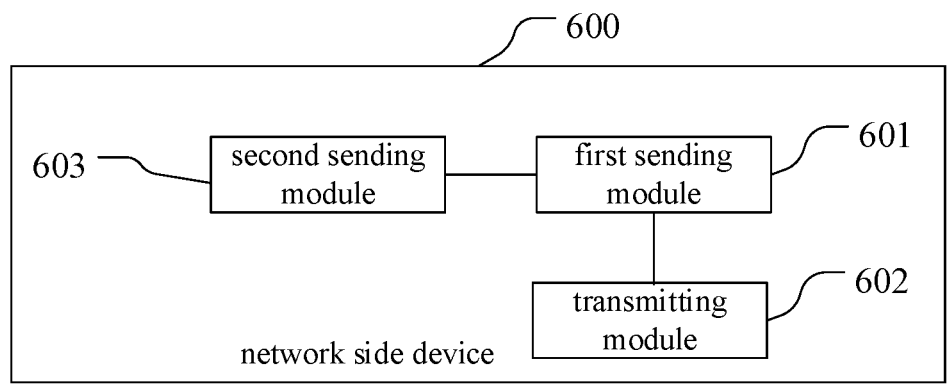
FIG. 7 is another structural diagram of a network side device provided by an embodiment of the present disclosure.

Optionally, if the network side device needs to send a reference signal to the terminal before the data transmission and after sending the data scheduling information, the indication information is used to indicate that the terminal does not enter the energy saving mode or enters the normal power consumption mode, as shown in FIG. 7, the network side device further includes: a second sending module 603, configured to send the reference signal; and/or, if the network side device does not need to send a reference signal to the terminal after sending the data scheduling information and before the data transmission, the indication information is used to indicate that the terminal enters the energy saving mode, or does not enter the normal power consumption mode.

Optionally, the reference signal includes at least one of the following: CSI-RS, TRS, a broadcast synchronization signal.

Optionally, the entering the energy saving mode or entering the abnormal power consumption mode includes: turning off part of devices of the terminal; or the entering the energy saving mode or entering the abnormal power consumption mode includes: entering a low power consumption mode or a mode where at least one energy saving technology is applied.

Optionally, the part of the devices includes at least one of the following: a radio frequency receiving device, a radio frequency sending device, a buffer, a baseband device, and other related device, where the other related device is a communication device other than the radio frequency receiving device, the radio frequency sending device, the buffer and the baseband device.

Optionally, the indication information is carried on PDCCH, PDSCH, a broadcast synchronization channel or a power saving channel. Wherein the energy saving channel is used to send a power saving signal.

Optionally, if the indication information is carried on the PDCCH, the indication information and the data scheduling information are carried on the same DCI; or if the indication information is carried on the PDCCH, the indication information and the data scheduling information are transmitted on different DCIs in the same time unit; or if the indication information is carried on the PDCCH, the indication information and the data scheduling information are transmitted in different time units, and a time domain position of a time unit in which the PDCCH carrying the indication information is located is earlier than a time domain location of a time unit in which the PDCCH of the data scheduling information is located.

Optionally, the indication information is indicated by bits; or the indication information is indicated by a scrambling code.

It should be noted that the network side device 600 in this embodiment may be a terminal of any implementation in the method embodiment of the present disclosure. Any implementation of the network side device in the method embodiment of the disclosure may be used by the network side device 600 of the embodiment of the present disclosure, and the same beneficial effects are achieved, which will not be repeated here.

Figure 8:
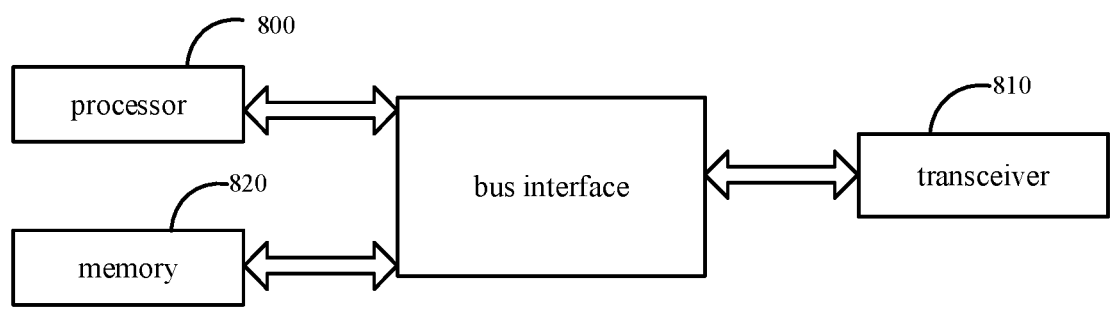
FIG. 8 is another structural diagram of a terminal provided by an embodiment of the present disclosure.

FIG. 8 is a structural diagram of another terminal provided by an embodiment of the present disclosure. As shown in FIG. 8, the terminal includes: a transceiver 810, a memory 820, a processor 800, and a program stored on the memory 820 and executed by the processor 800, wherein:

The transceiver 810 is configured to receive indication information and data scheduling information transmitted by a network side device;

The processor 800 is configured to enter an energy saving mode or an abnormal power consumption mode according to the indication information, wherein power consumption in the abnormal power consumption mode is lower than power consumption in the normal power consumption mode;

The transceiver 810 is further configured to perform data transmission according to the data scheduling information when a data transmission time corresponding to the data scheduling information arrives;

or,

The transceiver 810 is configured to receive indication information and data scheduling information transmitted by the network side device;

The transceiver 810 is further configured to enter an energy saving mode or enter an abnormal power consumption mode according to the indication information, wherein power consumption of the abnormal power consumption mode is lower than power consumption of the normal power consumption mode;

The transceiver 810 is further configured to perform data transmission according to the data scheduling information when the data transmission time corresponding to the data scheduling information arrives.

Among them, the transceiver 810 can be used to receive and send data under the control of the processor 800.

In FIG. 8, the bus architecture may include any number of interconnected buses and bridges. Specifically, various circuits of one or more processors represented by the processor 800 and the memory represented by the memory 820 are linked together. The bus architecture can also link various other circuits such as peripheral devices, voltage regulators, power management circuits, etc., which are all known in the art, and therefore, no further description will be given herein. The bus interface provides the interface. The transceiver 810 may be a plurality of elements, that is, include a transmitter and a receiver, and provide a unit for communicating with various other devices on the transmission medium.

The processor 800 is responsible for managing the bus architecture and general processing, and the memory 820 can store data used by the processor 800 when performing operations.

It should be noted that the memory 820 is not limited to being only on the terminal, and the memory 820 and the processor 800 may be separated in different geographic locations.

Optionally, the indication information includes at least one of the following: processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode. The time domain interval indication is used to indicate a time domain interval between data transmission and the data scheduling information.

Optionally, if the time scheduling information indicates that the time scheduling information corresponding to the data scheduling information is the same as the previous time scheduling information, the time scheduling information indication is used to indicate the terminal to determine whether to enter the energy saving mode or whether to enter the abnormal power consumption mode following the previous time scheduling information; or if the energy saving indication indicate to enter the energy saving mode, the energy saving indication is used to indicate the terminal to enter the energy saving mode or enter the abnormal power consumption mode; or the time scheduling information is used to indicate the terminal to enter the energy saving mode or enter the abnormal power consumption mode according to the time scheduling information; or the time domain interval indication is used to indicate the terminal to enter the energy saving mode or enter the abnormal power consumption mode according to the time domain interval.

Optionally, if the time scheduling information indicates that the time scheduling information corresponding to the data scheduling information is different from the previous time scheduling information, it is determined not to enter the energy saving mode, or to enter the normal power consumption, or it is determined whether to enter the energy saving mode or whether to enter the abnormal power consumption mode according to the time scheduling information corresponding to the data scheduling information; or if the energy saving indication indicates not to enter the energy saving mode or to enter the normal power consumption mode, then the terminal does not enter the energy saving mode or enters the normal power consumption mode; or if the processing capability of the terminal indicates that the processing time of the terminal is higher than the time domain interval, the terminal does not enter the power saving mode, or enters the normal power consumption mode.

Optionally, The processing capability threshold includes at least one of the following:

Time processing capability threshold, power consumption processing capability threshold, and energy processing capability threshold;

Wherein, in the case that the processing capability threshold includes the time processing capability threshold, if the processing capability of the terminal is not higher than the time processing capability threshold, the terminal enters the energy saving mode, or the abnormal power consumption mode; and/or, in the case that the processing capability threshold includes the time processing capability threshold, if the processing capability of the terminal is higher than the processing capability threshold, the terminal does not enter the energy saving mode, or enters the normal power consumption mode;

or,

In the case that the processing capability threshold includes the power consumption processing capability threshold or the energy processing capability threshold, if the processing capability of the terminal is not higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is higher than the power consumption processing capability threshold or the energy processing capability threshold, the terminal does not enter the energy saving mode, or enters the normal power consumption mode;

or,

In the case that the processing capability threshold includes the power consumption processing capability threshold or the energy processing capability threshold, if the processing capability of the terminal is higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is not higher than the power consumption processing capability threshold or the energy processing capability threshold, the terminal does not enter the energy saving mode, or enters the normal power consumption mode;

or,

In the case that the processing capability threshold includes the power consumption processing capability threshold and the energy processing capability threshold, if the processing capability of the terminal is not higher than the power consumption processing capability threshold or the energy processing capability threshold, or if the processing capability of the terminal is not higher than the power consumption processing capability threshold and the energy processing capability threshold, the terminal enters the energy saving mode, or the abnormal power consumption mode; and/or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the power consumption processing capability threshold and the energy processing capability threshold, the terminal does not enter the energy saving mode, or enters the normal power consumption mode;

or,

In the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the processing power capability threshold and the energy processing capability threshold, the terminal enters the energy saving mode or enters the abnormal power consumption mode; and/or, in the case that the processing capability threshold includes the power consumption processing capability threshold and the energy processing capability threshold, if the processing capability of the terminal is not higher than the power consumption processing capability threshold or the energy processing capability threshold, or the processing capability of the terminal is not higher than the power consumption processing capability threshold and the energy processing capability threshold, the terminal does not enter the energy saving mode, or enters the normal power consumption mode.

Optionally, the indication information includes: indication information reported by the terminal to the network side device; or second indication information obtained by the network side device according to the first indication information reported by the terminal, where the first indication information and the second indication information are the same or different.

Optionally, if the network side device needs to send a reference signal to the terminal before the data transmission and after sending the data scheduling information, the indication information is used to indicate that the terminal does not enter the energy saving mode or enters the normal power consumption mode, and as shown in FIG. 5, the terminal 400 further includes: a second receiving module 404, configured to receive the reference signal; and/or if the network side device does not need to transmit a reference signal to the terminal after sending the data scheduling information and before the data transmission, the indication information is used to indicate that the terminal enters the energy saving mode, or does not enter the normal power consumption mode.

Optionally, the reference signal includes at least one of the following: a channel state indication-reference signal CSI-RS, a tracking reference signal TRS, and a broadcast synchronization signal.

Optionally, the entering the energy saving mode or entering the abnormal power consumption mode includes: turning off part of devices of the terminal; or the entering the energy saving mode or entering the abnormal power consumption mode includes: entering a low power consumption mode or a mode where at least one energy saving technology is applied.

Optionally, the part of devices include but are not limited to at least one of the following: a radio frequency receiving device, a radio frequency sending device, a buffer, a baseband device, and other related device, where the other related device is a communication device other than the radio frequency receiving device, the radio frequency sending device, the buffer and the baseband device.

Optionally, the indication information is carried on PDCCH, PDSCH, a broadcast synchronization channel or a power saving channel. Wherein the energy saving channel is used to send a power saving signal.

Optionally, if the indication information is carried on the PDCCH, the indication information and the data scheduling information are carried on the same DCI; or if the indication information is carried on the PDCCH, the indication information and the data scheduling information are transmitted on different DCIs in the same time unit; or if the indication information is carried on the PDCCH, the indication information and the data scheduling information are transmitted in different time units, and a time domain position of a time unit in which the PDCCH carrying the indication information is located is earlier than a time domain location of a time unit in which the PDCCH of the data scheduling information is located.

Optionally, the indication information is indicated by bits; or the indication information is indicated by a scrambling code.

It should be noted that the terminal in this embodiment may be a terminal in any implementation in the method embodiment the present disclosure, and any implementation of the terminal in the method embodiment of the present disclosure may be used by the terminal in this embodiment, and the same beneficial effects are achieved, which will not be repeated here.

Figure 9:
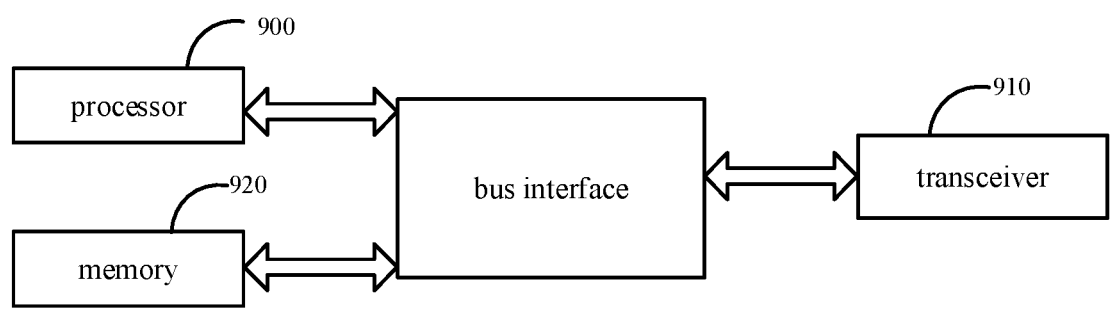
FIG. 9 is another structural diagram of a network side device provided by an embodiment of the present disclosure.

FIG. 9 is a structural diagram of another network side device provided by an embodiment of the present disclosure. As shown in FIG. 9, the network side device includes a transceiver 910, a memory 920, a processor 900, and a program stored on the memory 920 and executed by the processor, wherein:

The transceiver 910 is configured to send indication information and data scheduling information to a terminal, wherein the indication information is used to indicate whether the terminal enters an energy saving mode or whether to enter an abnormal power consumption mode after receiving the data scheduling information, power consumption of the abnormal power consumption mode is lower than power consumption of the normal power consumption mode;

The transceiver 910 is also configured to perform data transmission according to the data scheduling information.

The transceiver 910 can be used to receive and send data under the control of the processor 900.

In FIG. 9, the bus architecture may include any number of interconnected buses and bridges. Specifically, various circuits of one or more processors represented by the processor 900 and the memory represented by the memory 920 are linked together. The bus architecture can also link various other circuits such as peripheral devices, voltage regulators, power management circuits, etc., which are all known in the art, and therefore, no further description will be given herein. The bus interface provides the interface. The transceiver 910 may be a plurality of elements, that is, including a transmitter and a receiver, and provide a unit for communicating with various other devices on the transmission medium.

The processor 900 is responsible for managing the bus architecture and general processing, and the memory 920 can store data used by the processor 900 when performing operations.

It should be noted that the memory 920 is not limited to being only on the network side device, and the memory 920 and the processor 900 may be separated in different geographic locations.

Optionally, the indication information includes at least one of the following: processing capability threshold, time scheduling information indication, energy saving indication, time scheduling information, time domain interval indication; wherein the time scheduling information indication is used to indicate whether the time scheduling information corresponding to the data scheduling information is the same as a previous time scheduling information; the energy saving indication is used to indicate whether to enter the energy saving mode, or to indicate whether to enter the normal power consumption mode. The time domain interval indication is used to indicate a time domain interval between data transmission and the data scheduling information.

Optionally, if the time scheduling information indicates that the time scheduling information corresponding to the data scheduling information is the same as the previous time scheduling information, the time scheduling information indication is used to indicate the terminal to determine whether to enter the energy saving mode or whether to enter the abnormal power consumption mode following the previous time scheduling information; or if the energy saving indication indicate to enter the energy saving mode, the energy saving indication is used to indicate the terminal to enter the energy saving mode or enter the abnormal power consumption mode; or the time scheduling information is used to indicate the terminal to enter the energy saving mode or enter the abnormal power consumption mode according to the time scheduling information; or the time domain interval indication is used to indicate the terminal to enter the energy saving mode or enter the abnormal power consumption mode according to the time domain interval.

Optionally, if the time scheduling information indicates that the time scheduling information corresponding to the data scheduling information is different from the previous time scheduling information, the time scheduling information is used to indicate that the terminal does not enter the energy saving mode, or enters the normal power consumption mode, or the time scheduling information is used to indicate the terminal to decide whether to enter the energy saving mode or whether to enter the abnormal power consumption mode according to the time scheduling information corresponding to the data scheduling information; or if the energy saving indication indicates not to enter the energy saving mode or enter the normal power consumption mode, the energy saving indication is used to indicate the terminal not to enter the energy saving mode or enter the normal power consumption mode; or if the processing capability of the terminal indicates that a processing time of the terminal is higher than the time domain interval, the time domain interval indication is used to indicate the terminal not to enter the energy saving mode or enter the normal power consumption mode.

Optionally, the processing capability threshold includes at least one of the following:

Time processing capability threshold, power consumption processing capability threshold, and energy processing capability threshold;

Wherein, in the case where the processing capability threshold includes the time processing capability threshold, if the processing capability of the terminal is not higher than the time processing capability threshold, the time processing capability threshold is used to indicate to enter the energy saving mode, or enter the abnormal power consumption mode; and/or, in the case that the processing capability threshold includes the time processing capability threshold, if the processing capability of the terminal is higher than the processing capability threshold, then time processing capability threshold is used to indicate not to enter the energy saving mode, or to enter the normal power consumption mode;

or,

When the processing capability threshold includes the power consumption processing capability threshold or the energy processing capability threshold, if the processing capability of the terminal is not higher than the power consumption processing capability threshold or the energy processing capability threshold, the power consumption processing capability threshold or the energy processing capability threshold is used to indicate to enter the energy saving mode or enter the abnormal power consumption mode; and/or, in the case that the processing capability threshold includes the power consumption processing capability threshold or the energy processing capability threshold, if the processing capability of the terminal is higher than the processing power consumption threshold or the energy processing capability threshold, the processing power consumption threshold or the energy processing capability threshold is used to indicate not to enter the energy saving mode, or to enter the normal power consumption mode;

or,

In the case that the processing capability threshold includes the power consumption processing capability threshold or the energy processing capability threshold, if the processing capability of the terminal is higher than the power consumption processing capability threshold or the energy processing capability threshold, then the power consumption processing capability threshold or the energy processing capability threshold is used to indicate to enter the energy saving mode or enter the abnormal power consumption mode; and/or, the processing capability threshold includes the power consumption processing capability threshold or the energy processing capability threshold, if the processing capability of the terminal is not higher than the power consumption processing capability threshold or the energy processing capability threshold, then the power consumption processing capability threshold or the energy processing capability threshold is used to indicate not to enter the energy saving mode, or to enter the normal power consumption mode;

or,

In the case that the processing capability threshold includes the power consumption processing capability threshold and the energy processing capability threshold, if the processing capability of the terminal is not higher than the power consumption processing capability threshold or the energy processing capability threshold, or when the processing capability of the terminal is not higher than the power consumption processing capability threshold and the energy processing capability threshold, then the power consumption processing capability threshold and the energy processing capability threshold are used to indicate to enter the energy saving mode, or enter the abnormal power consumption mode; and/or, in the case that the processing capability threshold includes the power consumption processing capability threshold and the energy processing capability threshold, if the processing capability of the terminal is higher than the power consumption processing capability threshold or the energy processing capability threshold, or when the processing capability of the terminal is higher than the power consumption processing capability threshold and the energy processing capability threshold, the power consumption processing capability threshold and the energy processing capability threshold is used to indicate not to enter the energy saving mode, or to enter the normal power consumption mode;

or,

In the case that the processing capability threshold includes the power consumption processing capability threshold and the energy processing capability threshold, if the processing capability of the terminal is higher than the power consumption processing capability threshold or the energy processing capability threshold, or when the processing capability of the terminal is higher than the power consumption processing capability threshold and the energy processing capability threshold, the power consumption processing capability threshold and the energy processing capability threshold are used to indicate to enter the energy saving mode, or to enter the abnormal power consumption mode; and/or, in the case that the processing capability threshold includes the power consumption processing capability threshold and the energy processing capability threshold, if the processing capability of the terminal is not higher than the power consumption processing capability threshold or the energy processing capability threshold, or the processing capability of the terminal is not higher than the power consumption processing capability threshold and the processing energy threshold, then the power consumption processing capability threshold and the energy processing capability threshold are used to indicate not to enter the energy saving mode, or to enter the normal power consumption mode.

Optionally, the indication information includes: indication information reported by the terminal to the network side device; or second indication information obtained by the network side device according to the first indication information reported by the terminal, wherein the first indication information and the second indication information are the same or different.

Optionally, if the network side device needs to send a reference signal to the terminal before the data transmission and after sending the data scheduling information, the indication information is used to indicate that the terminal does not enter the energy saving mode or enters the normal power consumption mode, and the method further includes: receiving the reference signal by the terminal; and/or, if the network side device does not need to send a reference signal to the terminal after sending the data scheduling information and before the data transmission, the indication information is used to indicate that the terminal enters the energy saving mode, or does not enter the normal power consumption mode.

Optionally, the reference signal includes at least one of the following: CSI-RS, TRS, a broadcast synchronization signal.

Optionally, the entering the energy saving mode or entering the abnormal power consumption mode includes: turning off part of devices of the terminal; or the entering the energy saving mode or entering the abnormal power consumption mode includes: entering a low power consumption mode or a mode where at least one energy saving technology is applied.

Optionally, the part of the devices includes at least one of the following: a radio frequency receiving device, a radio frequency sending device, a buffer, a baseband device, and other related device, where the other related device is a communication device other than the radio frequency receiving device, the radio frequency sending device, the buffer and the baseband device.

Optionally, the indication information is carried on PDCCH, PDSCH, a broadcast synchronization channel or a power saving channel. Wherein the energy saving channel is used to send a power saving signal.

Optionally, if the indication information is carried on the PDCCH, the indication information and the data scheduling information are carried on the same DCI; or if the indication information is carried on the PDCCH, the indication information and the data scheduling information are transmitted on different DCIs in the same time unit; or if the indication information is carried on the PDCCH, the indication information and the data scheduling information are transmitted in different time units, and a time domain position of a time unit in which the PDCCH carrying the indication information is located is earlier than a time domain location of a time unit in which the PDCCH of the data scheduling information is located.

Optionally, the indication information is indicated by bits; or the indication information is indicated by a scrambling code.

It should be noted that the network side device in this embodiment may be a network side device in any implementation in the method embodiment of the present disclosure, and any implementation of the network side device in the method embodiment the disclosure may be implemented by the network side device in this embodiment and achieves the same beneficial effects, which will not be repeated here.

The embodiment of the present disclosure also provides a computer-readable storage medium on which a computer program is stored. When the program is executed by a processor, the steps of the signal receiving method provided in the embodiments of the present disclosure are implemented, or when the program is executed by the processor, the steps in the signal sending method provided by the embodiments of the present disclosure are implemented.

In the several embodiments provided in this disclosure, it should be understood that the method and device can be implemented in other ways. For example, the device embodiments described above are only illustrative. For example, the division of the units is only a logical function division, and there may be other divisions in actual implementation, for example, multiple units or components may be combined or can be integrated into another system, or some elements can be ignored or not implemented. In addition, the displayed or discussed mutual coupling or direct coupling or communication connection may be indirect coupling or communication connection through some interfaces, devices or units, and may be in electrical, mechanical or other forms.

In addition, the functional units in the various embodiments of the present disclosure may be integrated into one processing unit, or each unit may be separately physically included, or two or more units may be integrated into one unit. The integrated unit may be implemented in the form of hardware, or in the form of hardware plus software functional units.

Those skilled in the art may be aware that the units and algorithm steps described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered as going beyond the scope of the present disclosure.

Those skilled in the art can clearly understand that, for the convenience and conciseness of description, the specific working process of the above-described system, device, and unit can refer to the corresponding process in the method embodiment, which is not repeated here.

The units described as separate components may or may not be physically separated, and the components displayed as units may or may not be physical units, that is, they may be located in one place, or they may be distributed on multiple network units. Some or all of the units may be selected according to actual needs to achieve the objective of the solutions.

If the function is implemented in the form of a software functional unit and sold or used as an independent product, it can be stored in a computer readable storage medium. Based on this understanding, the technical solution of the present disclosure essentially or the part that contributes to the related technology or the part of the technical solution can be embodied in the form of a software product, and the computer software product is stored in a storage medium, including several instruction that are used to make a computer device (which may be a personal computer, a server, or a network device, etc.) execute all or part of the steps of the methods described in the various embodiments of the present disclosure. The storage medium include: U disk, mobile hard disk, ROM, RAM, magnetic disk or optical disk and other media that can store program codes.

Those skilled in the art can understand that all or part of the processes in the embodiment methods can be implemented by controlling the relevant hardware through a computer program. The program can be stored in a computer readable storage medium. When being executed, the program may include the steps of the method embodiments. Wherein, the storage medium may be a magnetic disk, an optical disc, a read-only memory (ROM), or a random access memory (RAM), etc.

It can be understood that the embodiments described in the present disclosure can be implemented by hardware, software, firmware, middleware, microcode, or a combination thereof. For hardware implementation, the processing unit can be implemented in one or more application specific integrated circuits (ASIC), digital signal processor (DSP), digital signal processing device (DSP Device, DSPD), programmable Logic Device (PLD), Field-Programmable Gate Array (FPGA), general-purpose processors, controllers, microcontrollers, microprocessors, and other electronic units for performing the functions described in this disclosure or the combination thereof.

For software implementation, the technology described in the embodiments of the present disclosure can be implemented through modules (for example, procedures, functions, etc.) that perform the functions described in the embodiments of the present disclosure. The software codes can be stored in the memory and executed by the processor. The memory can be implemented within the processor or external to the processor.

The integrated unit implemented in the form of a software functional unit may be stored in a computer readable storage medium. The software functional unit is stored in a storage medium, and includes several instructions to enable a computer device (which may be a personal computer, a server, or a network device, etc.) to execute some steps of the methods in the various embodiments of the present disclosure. The storage media include: U disk, mobile hard disk, read-only memory (ROM), random access memory (RAM), magnetic disks or optical disks, etc., which can store program codes.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A signal receiving method, comprising:
receiving, by a terminal, indication information and data scheduling information sent by a network side device;
entering, by the terminal, an energy saving mode or an abnormal power consumption mode according to the indication information, wherein power consumption in the abnormal power consumption mode is lower than power consumption in the normal power consumption mode;

performing, by the terminal, data transmission according to the data scheduling information when a data transmission time corresponding to the data scheduling information arrives;

wherein the indication information is carried on Physical downlink control channel (PDCCH);

wherein the indication information and the data scheduling information are carried on the same Downlink Control Information (DCI); or the indication information and the data scheduling information are sent on different DCIs in a same time unit; or the indication information and the data scheduling information are sent in different time units, and a time domain position of a time unit in which the PDCCH carrying the indication information is located is earlier than a time domain location of a time unit in which the PDCCH of the data scheduling information is located, wherein if the network side device needs to transmit a reference signal to the terminal after sending the data scheduling information and before the data transmission, the indication information is used to indicate that the terminal does not enter the energy saving mode or enters the normal power consumption mode, and the method further includes:

receiving, by the terminal, the reference signal; and/or, if the network side device does not need to transmit the reference signal to the terminal after sending the data scheduling information and before the data transmission, the indication information is used to indicate that the terminal enters the energy saving mode, or does not enter the normal power consumption mode.

2. The method according to claim 1, wherein the indication information includes at least one of the following:

a processing capability threshold, time scheduling information indication, energy saving indication, time scheduling information, time domain interval indication;

wherein the time scheduling information indication is used to indicate whether the time scheduling information corresponding to the data scheduling information is the same as a previous time scheduling information;

the energy saving indication is used to indicate whether to enter the energy saving mode, or to indicate whether to enter the normal power consumption mode;

the time domain interval indication is used to indicate a time domain interval between data transmission and the data scheduling information.

3. The method according to claim 2, wherein if the time scheduling information indicates that the time scheduling information corresponding to the data scheduling information is the same as the previous time scheduling information, it is determined whether to enter the energy saving mode or whether to enter the abnormal power consumption mode according to the previous time scheduling information; or if the energy saving indication indicate to enter the energy saving mode, or not to enter the normal power consumption mode, the terminal enters the energy saving mode or enters the abnormal power consumption mode; or the terminal enters the energy saving mode or enter the abnormal power consumption mode according to the time scheduling information; or the terminal enters the energy saving mode or enter the abnormal power consumption mode according to the time domain interval.

4. The method according to claim 3, wherein if the time scheduling information indicates that the time scheduling information corresponding to the data scheduling information is different from the previous time scheduling information, terminal does not to enter the energy saving mode, or enters the normal power consumption, or it is determined whether to enter the energy saving mode or whether to enter the abnormal power consumption mode according to the time scheduling information corresponding to the data scheduling information; or if the energy saving indication indicates not to enter the energy saving mode or to enter the normal power consumption mode, then the terminal does not enter the energy saving mode or enters the normal power consumption mode; or if the processing capability of the terminal indicates that processing time of the terminal is higher than the time domain interval, the terminal does not enter the power saving mode, or enters the normal power consumption mode.

5. The method according to claim 2, wherein the processing capability threshold includes at least one of the following:

a time processing capability threshold, a power consumption processing capability threshold, and an energy processing capability threshold;

wherein in the case that the processing capability threshold includes the time processing capability threshold, if the processing capability of the terminal is not higher than the time processing capability threshold, the terminal enters the energy saving mode, or the abnormal power consumption mode; and/or, in the case that the processing capability threshold includes the time processing capability threshold, if the processing capability of the terminal is higher than the processing capability threshold, the terminal does not enter the energy saving mode, or enters the normal power consumption mode;

or, in the case that the processing capability threshold includes the power consumption processing capability threshold or the energy processing capability threshold, if the processing capability of the terminal is not higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is higher than the power consumption processing capability threshold or the energy processing capability threshold, the terminal does not enter the energy saving mode, or enters the normal power consumption mode;

or, in the case that the processing capability threshold includes the power consumption processing capability threshold or the energy processing capability threshold, if the processing capability of the terminal is higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is not higher than the power consumption processing capability threshold or the energy processing capability threshold, the terminal does not enter the energy saving mode, or enters the normal power consumption mode;

or, in the case that the processing capability threshold includes the power consumption processing capability threshold and the energy processing capability threshold, if the processing capability of the terminal is not higher than the power consumption processing capability threshold or the energy processing capability threshold, or if the processing capability of the terminal is not higher than the power consumption processing capability threshold and the energy processing capability threshold, the terminal enters the energy saving mode, or the abnormal power consumption mode; and/or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the power consumption processing capability threshold and the energy processing capability threshold, the terminal does not enter the energy saving mode, or enters the normal power consumption mode;

or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the processing power capability threshold and the energy processing capability threshold, the terminal enters the energy saving mode or enters the abnormal power consumption mode; and/or, in the case that the processing capability threshold includes the power consumption processing capability threshold and the energy processing capability threshold, if the processing capability of the terminal is not higher than the power consumption processing capability threshold or the energy processing capability threshold, or the processing capability of the terminal is not higher than the power consumption processing capability threshold and the energy processing capability threshold, the terminal does not enter the energy saving mode, or enters the normal power consumption mode.

6. The method according to claim 1, wherein the indication information includes:

indication information reported by the terminal to the network side device; or second indication information obtained by the network side device according to the first indication information reported by the terminal, wherein the first indication information and the second indication information are the same or different.

7. The method according to claim 1, wherein the reference signal includes at least one of the following:

a channel state indication-reference signal (CSI-RS), a tracking reference signal (TRS), and a broadcast synchronization signal.

8. The method according to claim 1, wherein the entering the energy saving mode or entering the abnormal power consumption mode includes:

turning off part of devices of the terminal; or the entering the energy saving mode or entering the abnormal power consumption mode includes:

entering a low power consumption mode or a mode where at least one energy saving technology is applied.

9. The method according to claim 8, wherein the part of devices includes at least one of the following:

a radio frequency receiving device, a radio frequency sending device, a buffer, a baseband device, and other related device, wherein the other related device is a communication device other than the radio frequency receiving device, the radio frequency sending device, the buffer and the baseband device.

10. The method according to claim 1, wherein indication information is indicated by bits; or the indication information is indicated by a scrambling code.

11. A signal sending method, comprising:

sending, by a network side device, indication information and data scheduling information to a terminal, wherein the indication information is used to indicate whether the terminal enters an energy saving mode or whether to enter an abnormal power consumption mode after receiving the data scheduling information, power consumption in the abnormal power consumption mode is lower than power consumption in a normal power consumption mode;

performing, by the network side device, data transmission according to the data scheduling information;

wherein the indication information is carried on Physical downlink control channel (PDCCH);

wherein the indication information and the data scheduling information are carried on the same Downlink Control Information (DCI); or the indication information and the data scheduling information are sent on different DCIs in a same time unit; or the indication information and the data scheduling information are sent in different time units, and a time domain position of a time unit in which the PDCCH carrying the indication information is located is earlier than a time domain location of a time unit in which the PDCCH of the data scheduling information is located, wherein if the network side device needs to transmit a reference signal to the terminal after sending the data scheduling information and before the data transmission, the indication information is used to indicate that the terminal does not enter the energy saving mode or enters the normal power consumption mode, and the method further includes:

sending, by the network side device, the reference signal; and/or, if the network side device does not need to transmit the reference signal to the terminal after sending the data scheduling information and before the data transmission, the indication information is used to indicate that the terminal enters the energy saving mode, or does not enter the normal power consumption mode.

12. The method according to claim 11, wherein the indication information includes at least one of the following:

a processing capability threshold, time scheduling information indication, energy saving indication, time scheduling information, time domain interval indication;

wherein the time scheduling information indication is used to indicate whether the time scheduling information corresponding to the data scheduling information is the same as a previous time scheduling information;

the energy saving indication is used to indicate whether to enter the energy saving mode, or to indicate whether to enter the normal power consumption mode;

the time domain interval indication is used to indicate a time domain interval between data transmission and the data scheduling information.

13. The method according to claim 12, wherein if the time scheduling information indicates that the time scheduling information corresponding to the data scheduling information is the same as the previous time scheduling information, the time scheduling information indication is used to indicate the terminal to determine whether to enter the energy saving mode or whether to enter the abnormal power consumption mode according to the previous time scheduling information; or if the energy saving indication indicates to enter the energy saving mode, the energy saving indication is used to indicate the terminal to enter the energy saving mode or enter the abnormal power consumption mode; or the time scheduling information is used to indicate the terminal to enter the energy saving mode or enter the abnormal power consumption mode according to the time scheduling information; or the time domain interval indication is used to indicate the terminal to enter the energy saving mode or enter the abnormal power consumption mode according to the time domain interval.

14. The method according to claim 13, wherein if the time scheduling information indicates that the time scheduling information corresponding to the data scheduling information is different from the previous time scheduling information, the time scheduling information indicates the terminal not to enter the energy saving mode, or enter the normal power consumption, or the time scheduling information indicates the terminal to determine whether to enter the energy saving mode or whether to enter the abnormal power consumption mode according to the time scheduling information corresponding to the data scheduling information; or if the energy saving indication indicates not to enter the energy saving mode or to enter the normal power consumption mode, then the energy saving indication indicates the terminal not to enter the energy saving mode or enter the normal power consumption mode; or if the processing capability of the terminal indicates that processing time of the terminal is higher than the time domain interval, the time interval indication indicates the terminal not to enter the power saving mode, or enter the normal power consumption mode.

15. The method according to claim 12, wherein the processing capability threshold includes at least one of the following:

a time processing capability threshold, a power consumption processing capability threshold, and an energy processing capability threshold;

wherein in the case that the processing capability threshold includes the time processing capability threshold, if the processing capability of the terminal is not higher than the time processing capability threshold, the terminal enters the energy saving mode, or the abnormal power consumption mode; and/or, in the case that the processing capability threshold includes the time processing capability threshold, if the processing capability of the terminal is higher than the processing capability threshold, the terminal does not enter the energy saving mode, or enters the normal power consumption mode;

or, in the case that the processing capability threshold includes the power consumption processing capability threshold or the energy processing capability threshold, if the processing capability of the terminal is not higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is higher than the power consumption processing capability threshold or the energy processing capability threshold, the terminal does not enter the energy saving mode, or enters the normal power consumption mode;

or, in the case that the processing capability threshold includes the power consumption processing capability threshold or the energy processing capability threshold, if the processing capability of the terminal is higher than the power consumption processing capability threshold or the energy processing capability threshold, the terminal enters the energy saving mode, or the abnormal power consumption mode; and/or, in the case that the processing capability threshold includes the power consumption processing capability threshold or the energy processing capability threshold, if the processing capability of the terminal is not higher than the power consumption processing capability threshold or the energy processing capability threshold, the terminal does not enter the energy saving mode, or enters the normal power consumption mode;

or, in the case that the processing capability threshold includes the power consumption processing capability threshold and the energy processing capability threshold, if the processing capability of the terminal is not higher than the power consumption processing capability threshold or the energy processing capability threshold, or if the processing capability of the terminal is not higher than the power consumption processing capability threshold and the energy processing capability threshold, the terminal enters the energy saving mode, or the abnormal power consumption mode; and/or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the power consumption processing capability threshold and the energy processing capability threshold, the terminal does not enter the energy saving mode, or enters the normal power consumption mode;

or, in the case that the processing capability threshold includes the power consumption processing capability threshold and the energy processing capability threshold, if the processing capability of the terminal is higher than the power consumption processing capability threshold or the energy processing capability threshold, or if the processing capability of the terminal is higher than the processing power capability threshold and the energy processing capability threshold, the terminal enters the energy saving mode or enters the abnormal power consumption mode; and/or, in the case that the processing capability threshold includes the power consumption processing capability threshold and the energy processing capability threshold, if the processing capability of the terminal is not higher than the power consumption processing capability threshold or the energy processing capability threshold, or the processing capability of the terminal is not higher than the power consumption processing capability threshold and the energy processing capability threshold, the terminal does not enter the energy saving mode, or enters the normal power consumption mode.

16. A terminal, comprising: a transceiver, a memory, a processor, and a program stored on the memory and executed by the processor, wherein:
the transceiver is used to receive indication information and data scheduling information sent by a network side device;
the processor is configured to enter an energy saving mode or an abnormal power consumption mode according to the indication information, wherein power consumption in the abnormal power consumption mode is lower than power consumption in the normal power consumption mode;
the transceiver is further configured to perform data transmission according to the data scheduling information when a data transmission time corresponding to the data scheduling information arrives;
or,
the transceiver is used to receive the indication information and the data scheduling information transmitted by the network side device;
the transceiver is further configured to enter the energy saving mode or the abnormal power consumption mode according to the indication information, wherein the power consumption in the abnormal power consumption mode is lower than the power consumption in the normal power consumption mode;
the transceiver is further configured to perform data transmission according to the data scheduling information when the data transmission time corresponding to the data scheduling information arrives;
wherein the indication information is carried on Physical downlink control channel (PDCCH);
wherein the indication information and the data scheduling information are carried on the same Downlink Control Information (DCI); or
the indication information and the data scheduling information are sent on different DCIs in a same time unit; or
the indication information and the data scheduling information are sent in different time units, and a time domain position of a time unit in which the PDCCH carrying the indication information is located is earlier than a time domain location of a time unit in which the PDCCH of the data scheduling information is located,
wherein if the network side device needs to transmit a reference signal to the terminal after sending the data scheduling information and before the data transmission, the indication information is used to indicate that the terminal does not enter the energy saving mode or enters the normal power consumption mode, and the transceiver is further configured to:
receive the reference signal;
and/or,
if the network side device does not need to transmit the reference signal to the terminal after sending the data scheduling information and before the data transmission, the indication information is used to indicate that the terminal enters the energy saving mode, or does not enter the normal power consumption mode.

17. A network side device, comprising: a transceiver, a memory, a processor, and a program stored in the memory and executed by the processor, wherein
the transceiver is configured to implement the signal sending method according to claim 11.

* * * * *